(12) United States Patent
St. Jacques et al.

(10) Patent No.: US 9,235,274 B1
(45) Date of Patent: Jan. 12, 2016

(54) LOW-PROFILE OR ULTRA-THIN NAVIGATION POINTING OR HAPTIC FEEDBACK DEVICE

(75) Inventors: Brian St. Jacques, Campbell, CA (US); Michael Rogers, Campbell, CA (US)

(73) Assignee: APPLE INC., Cupertino, CA (US)

( * ) Notice: Subject to any disclaimer, the term of this patent is extended or adjusted under 35 U.S.C. 154(b) by 1997 days.

(21) Appl. No.: 11/881,166

(22) Filed: Jul. 25, 2007

Related U.S. Application Data

(60) Provisional application No. 60/833,384, filed on Jul. 25, 2006.

(51) Int. Cl.
G09G 5/00 (2006.01)
G06F 3/0354 (2013.01)

(52) U.S. Cl.
CPC ........ *G06F 3/03543* (2013.01); *G06F 3/03548* (2013.01)

(58) Field of Classification Search
CPC ....................... G06F 3/0338; G06F 2203/0334
USPC .......................................... 345/156, 167, 184
See application file for complete search history.

(56) References Cited

U.S. PATENT DOCUMENTS

| | | |
|---|---|---|
| 1,660,161 A | 2/1928 | Hansen |
| 1,683,059 A | 9/1928 | Van Deventer |
| 3,393,390 A | 7/1968 | Louis |
| 3,610,887 A | 10/1971 | Betzer ............................ 219/501 |
| 3,621,439 A | 11/1971 | Newbery ....................... 338/180 |
| 3,624,584 A | 11/1971 | Ohno .............................. 338/69 |
| 3,863,195 A | 1/1975 | Bowen ........................... 338/183 |
| 3,960,044 A | 6/1976 | Nagai et al. ..................... 84/1.01 |
| 3,997,863 A | 12/1976 | Luce ................................. 338/69 |
| 4,152,304 A | 5/1979 | Tadewald ....................... 252/506 |
| 4,257,305 A | 3/1981 | Friend et al. .................... 84/1.24 |

(Continued)

FOREIGN PATENT DOCUMENTS

| | | | |
|---|---|---|---|
| DE | 19606408 A1 | 8/1997 | ............. H01C 10/10 |
| GB | 2 247 938 A | * 8/1991 | |

(Continued)

OTHER PUBLICATIONS

Xudong Jiang et al., "Fingerprint Minutiae Matching Based on the Local and Global Structures," Sep. 2000, pp. 1038-1041, IEEE.

(Continued)

*Primary Examiner* — William Boddie
*Assistant Examiner* — Leonid Shapiro
(74) *Attorney, Agent, or Firm* — Allen, Dyer, Doppelt, Milbrath & Gilchrist, P.A. Attorneys at Law

(57) ABSTRACT

The present invention is directed to a low-profile or ultra-thin navigational pointing device incorporating haptic feedback related to the hardware designs, and sensor optimization relative to the functionally of joysticks, computer mice, gaming equipment, cell phones, personal digital assistants, telecommunications equipment, entertainment equipment, and other electronic pointing devices requiring height profiles of 5 mm or less. In one embodiment, a device in accordance with the present invention includes a support structure component, a read component, a sensor component, and a capture enclosure component. The read component is coupled to the support structure, and the sensor component is coupled to the capture enclosure where it is positioned in close proximity to the read component by capture enclosure.

19 Claims, 15 Drawing Sheets

(56) References Cited

U.S. PATENT DOCUMENTS

| | | | |
|---|---|---|---|
| 4,273,682 A | 6/1981 | Kanamori | 252/511 |
| 4,333,068 A | 6/1982 | Kishel | 338/158 |
| 4,419,653 A | 12/1983 | Waigand | 338/114 |
| 4,438,158 A | 3/1984 | Eichelberger et al. | 427/101 |
| 4,479,392 A | 10/1984 | Froeb et al. | 73/862.68 |
| 4,604,509 A | 8/1986 | Clancy et al. | 200/159 B |
| 4,745,301 A | 5/1988 | Michalchik | 307/119 |
| 4,746,894 A | 5/1988 | Zeldman | 338/99 |
| 4,765,930 A | 8/1988 | Mashimo et al. | 252/511 |
| 4,775,765 A | 10/1988 | Kimura et al. | 178/18 |
| 4,833,440 A | 5/1989 | Wojtanek | 338/114 |
| 4,878,040 A | 10/1989 | Tamura | 338/158 |
| 4,933,660 A | 6/1990 | Wynne, Jr. | 338/114 |
| 4,952,761 A | 8/1990 | Viebrantz | 200/513 |
| 5,060,527 A | 10/1991 | Burgess | 73/862.68 |
| 5,068,638 A | 11/1991 | Bickely et al. | 338/114 |
| 5,162,775 A | 11/1992 | Kuramochi et al. | 338/114 |
| 5,164,697 A | 11/1992 | Kramer | 338/69 |
| 5,283,735 A | 2/1994 | Gross et al. | 364/413.02 |
| 5,296,835 A | 3/1994 | Nakamura | 338/130 |
| 5,376,913 A | 12/1994 | Pine et al. | 338/114 |
| 5,429,006 A | 7/1995 | Tamori | 73/862.046 |
| 5,499,041 A | 3/1996 | Brandenburg et al. | 345/174 |
| 5,612,719 A | 3/1997 | Beernink et al. | 345/173 |
| 5,614,881 A | 3/1997 | Duggal et al. | 338/22 R |
| 5,621,318 A | 4/1997 | Jacobsen et al. | 324/207.22 |
| 5,644,283 A | 7/1997 | Grosse-Wilde et al. | 338/20 |
| 5,675,309 A | 10/1997 | DeVolpi | 338/68 |
| 5,689,285 A | 11/1997 | Asher | 345/161 |
| 5,740,276 A | 4/1998 | Tomko et al. | 382/210 |
| 5,825,352 A | 10/1998 | Bisset et al. | 345/173 |
| 5,876,106 A | 3/1999 | Kordecki | 362/29 |
| 5,889,507 A | 3/1999 | Engle et al. | 345/161 |
| 5,909,211 A | 6/1999 | Combs et al. | 345/172 |
| 5,912,612 A | 6/1999 | DeVolpi | 338/95 |
| 5,943,052 A | 8/1999 | Allen et al. | 345/341 |
| 5,945,929 A | 8/1999 | Westra | 341/34 |
| 5,949,325 A | 9/1999 | Devolpi | 338/154 |
| 5,995,084 A | 11/1999 | Chan et al. | 345/173 |
| 5,995,623 A | 11/1999 | Kawano et al. | 380/21 |
| 5,995,630 A | 11/1999 | Borza | 380/54 |
| 5,999,084 A | 12/1999 | Armstrong | 338/114 |
| 6,011,849 A | 1/2000 | Orrin | 380/42 |
| 6,035,398 A | 3/2000 | Bjorn | 713/186 |
| 6,057,830 A | 5/2000 | Chan et al. | 345/157 |
| 6,061,051 A | 5/2000 | Chan et al. | 345/173 |
| 6,135,958 A | 10/2000 | Mikula-Curtis et al. | 600/443 |
| 6,141,753 A | 10/2000 | Zhao et al. | 713/176 |
| 6,177,640 B1 * | 1/2001 | Okabe et al. | 200/6 A |
| 6,208,329 B1 | 3/2001 | Ballare | 345/173 |
| 6,219,793 B1 | 4/2001 | Li et al. | 713/202 |
| 6,219,794 B1 | 4/2001 | Soutar et al. | 713/202 |
| 6,239,790 B1 | 5/2001 | Martinelli et al. | 345/174 |
| 6,256,012 B1 | 7/2001 | Devolpi | 345/161 |
| 6,317,508 B1 | 11/2001 | Kramer et al. | 382/124 |
| 6,323,846 B1 | 11/2001 | Westerman et al. | 345/173 |
| 6,344,791 B1 | 2/2002 | Armstrong | 338/114 |
| 6,352,477 B1 | 3/2002 | Soma et al. | |
| 6,404,323 B1 | 6/2002 | Schrum et al. | 338/92 |
| 6,408,087 B1 | 6/2002 | Kramer | 382/124 |
| 6,437,682 B1 | 8/2002 | Vance | 338/185 |
| 6,601,169 B2 | 7/2003 | Wallace, Jr. et al. | 713/151 |
| 6,653,579 B2 * | 11/2003 | Inoue et al. | 200/6 A |
| 6,754,365 B1 | 6/2004 | Wen et al. | 382/100 |
| 6,804,378 B2 | 10/2004 | Rhoads | 382/100 |
| 6,876,756 B1 | 4/2005 | Vieweg | 382/124 |
| 7,002,553 B2 | 2/2006 | Shkolnikov | 345/169 |
| 7,003,670 B2 | 2/2006 | Heaven et al. | 713/186 |
| 7,020,270 B1 | 3/2006 | Ghassabian | 379/368 |
| 7,054,470 B2 | 5/2006 | Bolle et al. | 382/124 |
| 7,113,179 B2 | 9/2006 | Baker et al. | 345/178 |
| 7,190,251 B2 * | 3/2007 | Schrum et al. | 338/92 |
| 7,339,572 B2 | 3/2008 | Schena | 345/156 |
| 7,474,772 B2 | 1/2009 | Russo et al. | 382/124 |
| 2001/0012036 A1 | 8/2001 | Giere et al. | 347/62 |
| 2002/0058549 A1 * | 5/2002 | Armstrong | 463/37 |
| 2002/0130673 A1 | 9/2002 | Pelrine et al. | 324/727 |
| 2002/0186203 A1 | 12/2002 | Huang | 345/157 |
| 2003/0027180 A1 | 2/2003 | Hamid | 382/124 |
| 2003/0028811 A1 | 2/2003 | Russo et al. | 345/157 |
| 2003/0214481 A1 | 11/2003 | Xiong | 345/157 |
| 2004/0208348 A1 | 10/2004 | Baharav et al. | 382/124 |
| 2004/0263479 A1 | 12/2004 | Shkolnikov | 345/169 |
| 2005/0012714 A1 | 1/2005 | Russo et al. | 345/157 |
| 2005/0041885 A1 | 2/2005 | Russo | 382/289 |
| 2005/0179657 A1 | 8/2005 | Russo et al. | 345/163 |
| 2005/0259851 A1 | 11/2005 | Fyke | 382/124 |
| 2006/0034043 A1 | 2/2006 | Hisano et al. | 361/681 |
| 2006/0103633 A1 | 5/2006 | Gioeli | 345/173 |
| 2006/0242268 A1 | 10/2006 | Omernick et al. | 709/219 |
| 2007/0016779 A1 | 1/2007 | Lyle | 713/169 |
| 2007/0034783 A1 | 2/2007 | Eliasson et al. | 250/221 |
| 2007/0038867 A1 | 2/2007 | Verbauwhede et al. | 713/186 |
| 2007/0061126 A1 | 3/2007 | Ursso et al. | 703/24 |
| 2007/0067642 A1 | 3/2007 | Singhal | 713/186 |
| 2007/0125937 A1 | 6/2007 | Eliasson et al. | 250/221 |
| 2007/0146349 A1 | 6/2007 | Errico et al. | 345/174 |

FOREIGN PATENT DOCUMENTS

| | | | |
|---|---|---|---|
| GB | 2 247 938 A * | 3/1992 | |
| JP | 09071135 | 3/2007 | B60J 7/02 |
| WO | WO 01/39134 A3 | 5/2001 | G07C 9/00 |
| WO | WO 01/73678 A1 | 10/2001 | G06K 9/00 |
| WO | WO 01/94892 A3 | 12/2001 | G06K 9/00 |
| WO | WO 01/94966 A2 | 12/2001 | |
| WO | WO 01/95305 A1 | 12/2001 | G06K 9/00 |
| WO | WO 02/86800 A1 | 10/2002 | G06K 9/00 |
| WO | WO 03/075210 A2 | 9/2003 | G06K 9/00 |

OTHER PUBLICATIONS

Kyung Deok Yu et al., "A Fingerprint Matching Algorithm based on Radial Structure and a Structure-Rewarding Scoring Strategy," Jun. 2005, pp. 656-664, AVBPA, LNCS, Audio- and Video-Based Biometric Person Authentication Springer-Verlag Berlin Heidelberg.

* cited by examiner

LOW-PROFILE OR ULTRA-THIN NAVIGATION POINTING OR HAPTIC FEEDBACK DEVICE

RELATED APPLICATIONS

The present application claims priority under 35 U.S.C. §119(e) from Provisional U.S. Patent Application Ser. No. 60/833,384, titled "LOW PROFILE OR ULTRA-THIN NAVIGATION POINTING OR HAPTIC FEEDBACK DEVICES" filed Jul. 25, 2006, which is incorporated herein by reference in its entirety and for all purposes.

FIELD OF THE INVENTION

The present invention is related to enhancing the functionality of at least one low-profile or ultra-thin controller device to a navigational pointing task or haptic feedback event. In particular, the present invention is related to the use of novel methods, and hardware designs relative to the functionality of joysticks, computer mice, gaming equipment, cell phones, personal digital assistants, digital music players, telecommunication equipment, entertainment equipment, and other electronic devices requiring low or ultra-thin height profiles.

BACKGROUND OF THE INVENTION

Control devices, such as joystick navigational pointing devices, are commonplace components related to gaming equipment, cell phones, personal digital assistants, telecommunications equipment, entertainment equipment, digital music players, and other electronic devices. Users now require, to a large degree, the presence of such pointing devices that provide functionality related to touch (e.g. feeling), sight and sound in a dynamic fashion on demand.

For practicality, firmware can be defined as software that is embedded in a hardware device that allows reading and executing the software, but does not allow modification, such as, writing or deleting data by an end user. An example of firmware is a computer program in a read-only memory (ROM) integrated circuit chip. A hardware configuration is usually used to represent the software. Another example of firmware is a program embedded in an erasable programmable read-only memory (EPROM) chip, which program may be modified by special external hardware, but not by an application program.

With regard to navigation devices such as joysticks and computer mice, firmware is used to control the movement of the cursor related to the interaction between the navigation device and the user. For example, as the user moves the navigation device pointer up or North, the cursor moves up or North on the display screen.

Related to haptic feedback, firmware can be used to unify the interaction between a navigation device and user with haptics such as touch sensations, creating the ultimate digital and sensory experience for the user. Using a cell phone joystick as an example, firmware controlling the joystick allows the user to experience all spatial senses such as sight, hearing, and touch making a feature-rich phones easier and more enjoyable to use.

Firmware that adds sight, sound cues, and touch sensations that allows greater realism and intuition in the way people navigate and use joysticks and other navigation pointers in gaming environments (such as when users are playing a game on their cell phone or personal digital assistant) can be defined generally as haptic firmware.

Haptic firmware technologies embedded in such devices help solve the product differentiation problem for handset manufacturers and operators, provide more practical and interactive content options for developers, and redefine the quality of the communication experience for end users.

Variable resistance devices have been used in many applications including joysticks, navigation pointers, sensors, switches, cell phones and transducers. A potentiometer is a simple example of a variable resistance device which has a fixed linear resistance element extending between two end terminals and a slider which is keyed to an input terminal and makes movable contact over the resistance element. The resistance or voltage (assuming constant voltage across the two end terminals) measured across the input terminal and a first one of the two end terminals is proportional to the distance between the first end terminal and the contact point on the resistance element. Resistive elastomers or resistive rubber materials have been used as resistance elements including variable resistance devices. The terms "resistive rubber", "resistive rubber material" and "resistive material" as used herein, refer to an elastomeric or rubber material which is interspersed with electrically conductive materials including, for example, carbon black, or metallic powder or both.

Examples of pointing devices include U.S. Pat. No. 6,404, 323, issued to Schrum et al., titled "Variable Resistance Devices and Methods," which is hereby incorporated by reference focuses on variable resistance and sensor movement. U.S. Pat. No. 6,352,477, issued to Soma et al., both disclose various types of position reporting devices, joystick, or pointing devices incorporating force related technology.

U.S. Pat. No. 6,404,323, issued to Schrum et al., teaches a variable resistance device that comprises a resistive member having a resistive rubber material. A first conductor is configured to be electrically coupled with the resistive member at a first contact location over a first contact area. A second conductor is configured to be electrically coupled with the resistance member at a second contact location over a second contact area. The first contact location and second contact location are spaced from one another by a distance. The resistance between the first conductor at the first contact location and the second conductor at the second contact location is equal to the sum of a straight resistance component and a parallel path resistance component. At least one of the first location, the second location, the first contact area, and the second contact area is changed to produce a change in resistance between the first conductor and the second conductor. A resistance component increases or decreases as the distance between the first contact location and the second contact location increases or decrease, respectively. The resistance component has predetermined desired characteristics based on selected first and second contact locations and selected first and second contact areas. The first and second contact locations and first and second contact areas can be selected such that the change in the resistance between the first and second contact locations is at least substantially equal to the change in position.

When variable resistance devices similar to those of Schrum et al. are utilized in a gaming environment, a voltage divider value, related to the change in resistance, is determined by a X and Y axis location of the rubber contact across a conductive "read" area. This read area is analogous to the location of a "wiper" across a resistive area in a traditional potentiometer.

The resistance of the rubber used also changes when a Z-axis force is applied. If the Z-axis resistance change differs from the X, Y axis resistance change it can cause counterintuitive results for the user causing inconsistent positioning reporting. More specifically, when resistive rubber technology is used in gaming devices in high emotion environments, many times device users use extreme amounts of force in handling such gaming devices.

Another example of inconsistent position reporting is also disclosed in U.S. Pat. No. 6,352,477, issued to Soma et al. That problem involved in a force feedback device for sensing the position of the manipulandum near the limits to provided degrees of freedom. For example, force feedback devices typically provide hard stops to limit the motion of the manipulandum to a constrained range. Due to compliance in the mechanical and/or drive system, the problem of sensing the position of the manipulandum is exacerbated at the hard stops. For example, when the user moves the manipulandum fast against the hard stop, the compliance in the system may allow further motion past the hard stop to be sensed by the sensor due to compliance and momentum of the manipulandum. However, when the manipulandum is moved slowly, the momentum inertia is not as strong, and the sensor may not sense extra motion past the hard stop. These two situations can cause problems in sensing an accurate position consistently.

The inconsistent position reporting problem is further exacerbated with variable device joysticks and pointing devices being incorporated into cell phones, digital music players, and personal digital assistants (or PDAs) imposing additional restrictions on the height and size of such devices requiring a miniature form factor or elevation.

As users demand haptic feedback and require dynamic analog performance in a digital environment, the size and height of such conventional devices that meet such criterion are at odds with the user demand for low profile or ultra-thin, high-performance electronic equipment.

There is a need to address these and other drawbacks that are inconsistent with user demands for correct and dynamic position reporting, haptic feedback, and physically thin devices.

SUMMARY OF THE INVENTION

This and other objects are achieved by various embodiments of the present invention which provides, in a broad aspect, variable resistance and firmware methods devices that use the resistive characteristics of resistive material components. The inventors have discovered characteristics of resistive resilient components such as resistive rubber materials that previously have not been known or utilized. More specifically, the present invention is for an ultra-thin navigational pointer device. Additionally, the invention is a method of manufacturing such a device.

In one embodiment of the present invention, the ultra-thin navigational pointer device comprises a support structure, a read component, a sensor component, and capture enclosure. The read component is coupled to the support structure. A sensor component is placed over and adjacent to the read component but not in contact with the read component. The sensor component is covered with a capture enclosure. The capture enclosure has an aperture to allow user contact with the sensor component. The support structure can typically be formed from a PCB board with any required electrical interconnects formed onto or within the layers of the PCB board. The read component is typically an electrically conductive pattern formed on the PCB board. This pattern can include a plurality of read components. Each read element forms a signal having a value when a user asserts a force to the sensor component causing contact between sensor component and one or more read components. The signal value will vary in accordance with the geometry of the read component. The signal can be electronically evaluated to make an approximate determination of a location of the user input relative to the read element. The capture enclosure is preferably configured with an aperture that substantially covers the edges of the sensor component. In one aspect of the invention, the sensor component can be formed from a resistive resilient material such as resistive rubber materials. The resistive resilient material can include a matrix of silicone, silicone derivatives, rubber, rubber derivatives, neoprene, neoprene derivatives, elastomers, elastomer derivatives, urethane, urethane derivatives, shape memory materials, or combinations of these.

In another aspect of the present invention, the sensor component can be configured with a haptic feedback device coupled to the sensor component. This haptic feedback device is preferably substantially centered within the aperture on the capture enclosure and is coupled to the sensor component. This device can comprise a joystick coupled to the sensor component which provides the user tactile feedback of where the center of the navigation devices center is located. In another aspect of the invention, an auto-centering component is coupled to sensor component. The auto-centering component can be either rigid or flexible. The auto-centering component resists the lateral forces asserted by the user and returns the sensor component back to its resting position after displacement from user input forces. In another aspect of the invention the device is configured to be less than 2 mm in height. The height would include all layers of the device including the support structure, the read component, the sensor component and the capture enclosure. In yet another aspect of the present invention, the ultra-thin pointer device includes an environmental seal which is positioned between the capture enclosure and the sensor component. This seal prevents particles or liquid from getting between the sensor component and the read component, causing either unwanted conductivity between the sensor component and read components or interfering with the contact between the sensor component and the read component when user input is provided. In another aspect of the present invention, the sensor component is configured to have an electrical voltage coupled to the sensor component. The coupling of a voltage to the sensor component can be at one or multiple points. The voltage can be either positive, negative or can be coupled to ground. The read component is configured to output a signal value. The signal value is a voltage that can vary depending on the user input to the sensor component. The signal value varies in a manner that is representative of the placement of the user input over the read element. Further, the invention can incorporate a plurality of read elements, each read element providing a signal output.

Another embodiment of the invention is for a method of fabricating of an ultra-thin navigational pointer device. The fabrication of the navigational pointer device comprises forming a support structure component, forming a read component where the read component is coupled to the support structure. A sensor component is formed and is positioned adjacent to but not touching the read component. The sensor component and is held in a juxtaposed position over the read structure by the capture enclosure. In one aspect of the invention, the sensor component is formed out of resistively resilient material. Another aspect of the invention, includes the step of forming a haptic feedback component which is coupled to the sensor component. This allows for user to have tactile feedback of where their finger is positioned on the navigation device. In another embodiment of the present invention, the method includes the step of forming an auto-centering component and coupling the auto-centering component to the sensor component. The auto-centering component is preferably coupled to the capture enclosure. Alternatively, the auto-centering component is coupled to the support structure. Preferably, the navigational pointer device is 2 mm or less in height. In another aspect of the present invention, an electrical connection is made to the sensor component for the application of a voltage. This connection can be made at a single point or at multiple points. The read component is configured to generate an output signal. In another aspect of the present invention, the read component comprises of a plurality of read elements. Each read element produces a signal. The plurality of read elements are configured to produce an array of signal values.

In another embodiment of the present invention, a sensor component couples to a support structure. A read component is placed in close proximity over the sensor component. A capture enclosure is positioned to cover the read component and the sensor component. In one aspect of the invention, a joystick is coupled to the read component and configured to transmit the mechanical force asserted by a user to the read component while causing the read component to come into contact with the sensor component. In another aspect of the present invention, the read component is formed from a resistive resilient material. In a further aspect of the invention, the read component and is electrically coupled to a voltage input and the sensor component is configured to generate a signal to an output.

Where sensor component is formed from resistive resilient material, the resistance of the sensor component is directly proportional to the resistivity of the material and the length and/or shape of the sensor component and is also inversely proportional to the cross-sectional area perpendicular to the direction of current flow. The resistance is represented by the following well-known equation:

$$R = .rho.l/A \qquad (1)$$

where .rho. is the resistivity of the resistor material, l is the length of the resistor along the direction of current flow, and A is the cross-sectional area perpendicular to the current flow. Resistivity is a property of a material and is typically measured in units of ohms. The voltage drop across the resistor is represented by the well-known Ohm's law:

$$R = E/I \qquad (2)$$

where E is the voltage across the resistor and I is the current through the resistor.

When resistors are joined together in a network, the effective resistance is the sum of the individual resistances if the resistors are joined in series. The effective resistance increases when the number of resistors that are joined in series increases. That is, the effective resistance increases when the total length l of the resistors increases, assuming a constant cross-sectional area A according to a specific example based on equation (1). If the resistors are joined in parallel or juxtaposed to one another, however, the effective resistance is the reciprocal of the sum of the reciprocals of the individual resistances. The higher the number of resistors that are joined in parallel or juxtaposed, the lower the effective resistance is. This is also consistent with equation (1), where the effective resistance decreases when the total area A of the resistors increases in a specific example, assuming a constant length l.

Commonly available resistors typically include conductive terminals at two ends or leads that are connected between two points in a circuit to provide resistance. These resistors are simple and discrete in structure in the sense that they each have well-defined contact points at two ends with a fixed resistance therebetween. The effective resistance of a resistive network formed with resistors that have such simple, discrete structures is easily determinable by summing the resistances for resistors in series and by summing the reciprocals of the resistances for resistors that are in parallel, or juxtaposed, and taking the reciprocal of the sum. Geometric factors and contact variances are absent or at least sufficiently insignificant in these simple resistors so that the effective resistance is governed by the simple equations described above. When the resistors are not simple and discrete in structure, however, the determination of the effective resistance is no longer so straightforward.

The inventors have discovered that the effective resistance is generally the combination of a straight path resistance component and a parallel path resistance component. The straight path resistance component or straight resistance component is analogous to resistors in series in that the straight resistance component between two contact locations increases with an increase in distance between the to contact locations, just as the effective resistance increases when the total length l increases and the area A is kept constant in equation (1). The increase in the amount of resistive material in the current path between the two contact locations causes the increase in resistance. The parallel path resistance component is analogous to resistors in parallel or juxtaposed. As discussed above, the effective resistance decreases when the total area A of the combined resistors having a common length l increases.

BRIEF DESCRIPTION OF THE DRAWINGS

The invention is better understood by reading the following detailed description of an exemplary embodiment in conjunction with the accompanying drawings.

DETAILED DESCRIPTION OF THE INVENTION

The following description of the invention is provided as an enabling teaching of the invention in its best, currently known embodiment. Those skilled in the relevant art will recognize that many changes can be made to the embodiment described, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptions to the present inventions are possible and may even be desirable in certain circumstances, and are a part of the present invention. Thus, the following description is provided as illustrative of the principles of the present invention and not in limitation thereof, since the scope of the present invention is defined by the claims.

Figure 1A:
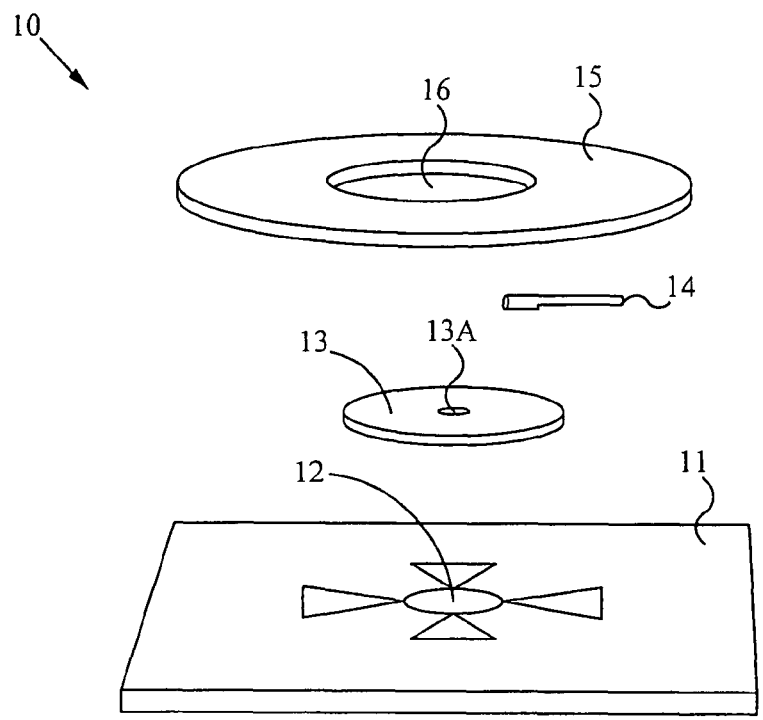
FIG. 1A is an exploded perspective view of an ultra-thin navigation device.
Figure 1B:
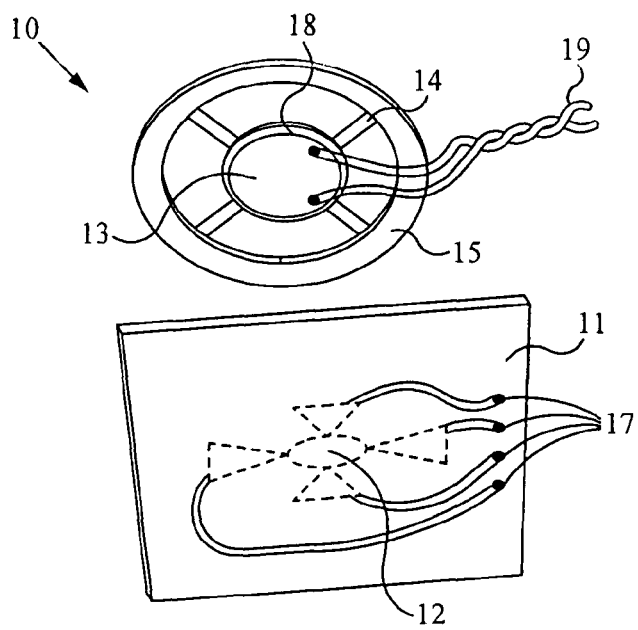
FIG. 1B is a bottom exploded perspective view of an ultra-thin navigation device.
Figure 2:
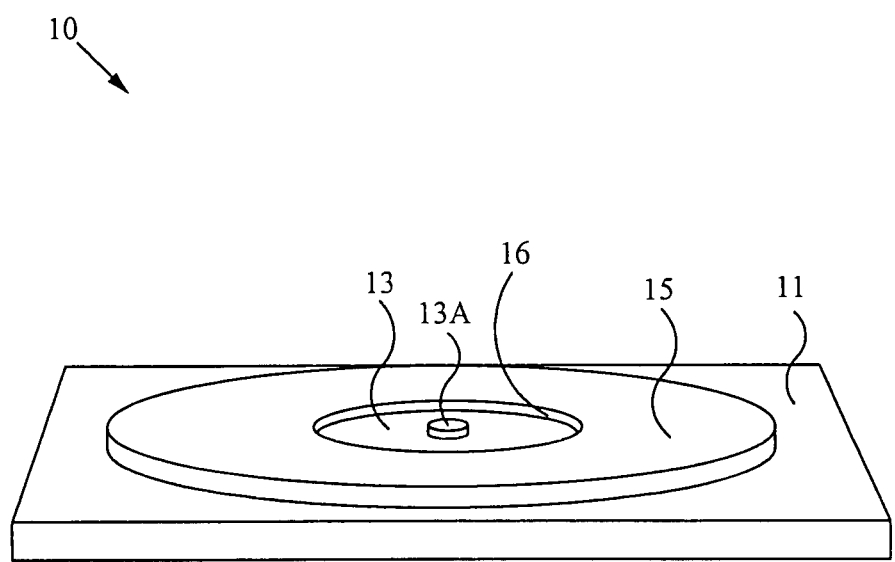
FIG. 2 is an assembled view of the ultra-thin navigation device.
Figure 3:
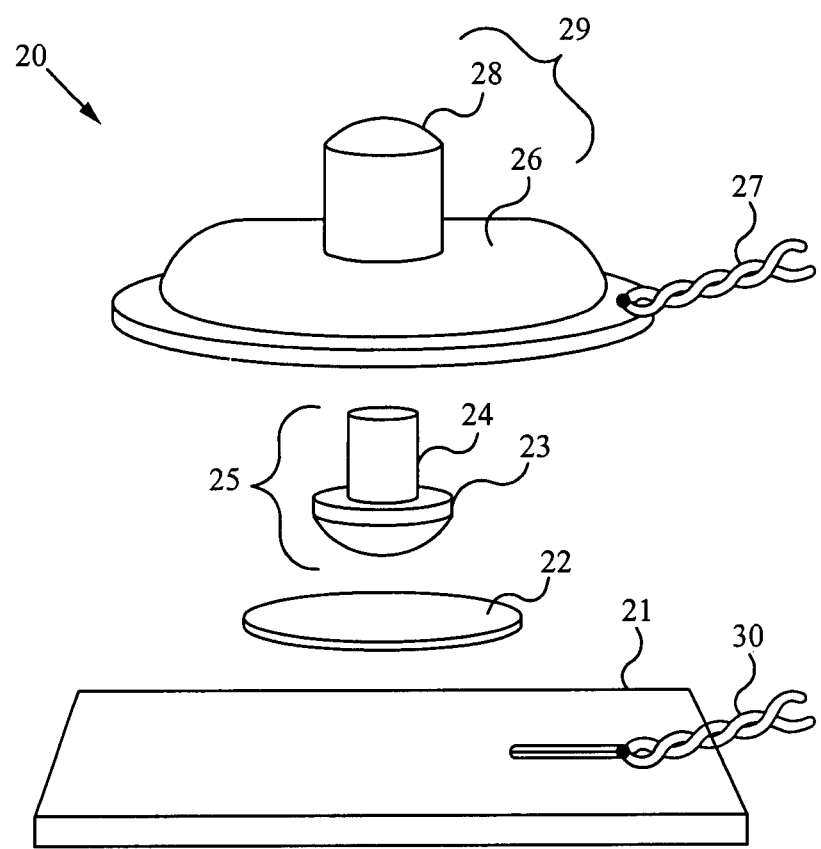
FIG. 3 is an exploded view perspective view of a low-profile navigational device.

A further embodiment of the present invention discloses navigational pointing devices in a low-profile or ultra-thin module mode. Low-profile can be considered, but not limited to, devices under 5 mm in height while ultra-thin can be considered, but not limited to, devices under 2 mm in height. FIG. 1A, 1B and FIG. 2 illustrate an example of an ultra-thin navigational pointing device. FIG. 3 outline an example of a low-profile navigational pointing device.

Ultra-thin navigational pointing or haptic feedback devices contemplated by embodiments of the present invention included sensing components which can be resistive, conductive, inductive, capacitive, or electrical event based. The resistive resilient material matrix or sensor elements of various embodiments of the present invention are selected from a group consisting of but not limited to: silicone; silicone derivatives; rubber; rubber derivatives; neoprene; neoprene derivatives; elastomers; elastomer derivatives; urethane, urethane derivatives; shape memory materials; conducive films, PET film, conductive inks, conductive polymers, conductive coatings; polymer coatings; doped conductive coatings, doped conductive polymer coatings, combinations or derivatives thereof.

Referring to FIG. 1A, 1B, and FIG. 2 provides a disclosure of the preferred embodiment of the of an ultra-thin navigational pointer 10. FIG. 1A shows an exploded view of an embodiment of an ultra-thin navigational pointer device 10. The support structure 11 provides a base for the read components 12 and support for the capture enclosure 15. Further the support structure 11 limits the pressure translated from the actuator to the multiple resistive members. As shown in FIGS. 1A and 1B, the support structure is flat but other shapes are contemplated including curved or conical shaped support structures 11. Preferably the support structure 11 is a PCB board but can be any material that meets the mechanical force requirements for user input forces and the physical properties required for coupling the read components 12 to the support structure 11 and the electrical properties for electrically coupling the signals to a connector or terminal. Either coupled to or formed directly onto the support structure 11 are the read components 12. Juxtaposed to the coupled read components 12 and coupled to the support structure 11 is the sensor component 13. Attaching to sensor component 13 and a capture enclosure 15 is an auto-centering component 14. Only one auto-centering component 14 is illustrated in FIG. 1A but multiple auto-centering components 14 can be used to form a deformable or rigid attachment between the capture enclosure 15 and the sensor component 13 as shown in FIG. 1B. Optionally attached to the sensor component 13 is a haptic feedback component 13A. The haptic feedback component 13A is a rigid or semi-rigid raised area located substantially in the center of the sensor component 13 and provides the user with feedback on the center position of the navigational pointer device 10. The sensor component 13 can be held in at least two configurations. In the first configuration the sensor component 13 is fixed and does not move laterally in response to lateral user forces. The sensor component 13 only responds to a horizontal force which causes the sensor component to contact the read components 12 which in tern is are used to determine the user input position and movement. Alternatively, the sensor component 13 are held by auto-centering components 14 with elasticity and thus giving the sensor component 13 the capability of lateral movement within the capture enclosure 15. The auto-centering components 14 are attached to the sensor component 13 on one end and either the capture enclosure 15 or the support structure 11 on the other end. If the auto-centering component 14 is flexible, then the sensor component 13 can move laterally in response to a user input. The auto-centering component 14 can include memory wire; elastic bands; polymeric springs; shape memory polymers; or muscle wire. The read component 12 can take the shape of the quadrangle regions as shown in FIG. 1A. Those skilled in the arts would recognize that different read component shapes can be used to generate different signal response profiles from the read components as varying contact is made between the read components 12 and the sensor component 13. Examples of a read component shapes contemplated by the present invention, but not limited to these figures, are illustrated in FIGS. 6, 9A, 10A, 10B, 11, 15A, 15B, 17, 18, and 19. It will be appreciated that the read component in a navigation device can include multiple separate contact elements each for controlling a different direction of movement.

FIG. 1B illustrates a bottom view of a partially exploded illustration of the ultra-thin navigational device 10. The support structure 11 is shown with the read components 12 formed on the opposite side of the support structure 11. As shown, four auto-centering components 14 are coupled to the sensor component 13 and the capture enclosure 15. The sensor component 13 is preferably equal to or larger than the aperture 16 in the capture enclosure 15. Further, an optional environmental seal 18 is shown placed between the capture enclosure 15 and the sensor component 13. Such a seal 18 prevents moisture or particles from getting under the capture enclosure 15 and potentially interfering with the contact between the sensor component 13 and the read component 12. An electrical connection 19 is formed to the sensor component 13. The electrical connection 19 enables a voltage to be applied to the sensor component 13 which is further transferred to the read components 12 when a user input causes contact between the sensor component 13 and the read components 12.

FIG. 2 illustrates an assembled version of the ultra-thin navigational device 10. The device 10 comprises a support structure 11 coupled to a capture enclosure 15. The capture enclosure 15 has an aperture 16 formed approximately in the center of the capture enclosure 15. The sensor component 13 is centered within this aperture 16 and the capture enclosure 15 overlays the sensor component 13. A haptic feedback component 13A can optionally be attached in the center of the sensor component 13. The support structure 11 is typically a PCB board on which a read component 12 is coupled or formed. The capture enclosure 15 covers the read components 12 on the support structure 11 and any auto-centering components (see FIG. 1A, 14). Thus, the capture enclosure 15 protects the support structure 11 and the coupled read components 12 from user contact, a user's finger, and environmental elements. Further, the capture enclosure 15 can include decorative features such as colors, pictures, lights and fanciful designs. Additionally, the combination of the capture enclosure 15 and the auto-centering components (FIG. 1A, 14) hold the sensor component 13 juxtaposed to the read component 12. Preferably, the sensor component 13 consists of a resistive resilient material. When horizontal pressure from user input such as a finger causes the sensor component 13 to contact the read component (FIG. 1A, 12), the resulting output can be sensed to compute the movement and position of the user input. An optionally haptic feedback component 13A attaches to the sensor component 13. This haptic feedback component 13A is used to provide the user with feedback about where the center of the pointing device is located.

FIG. 3 illustrates an exploded perspective view of one embodiment of an low-profile navigation device 20. The navigational device comprises an actuator cap 29 which provides a protective cover for the conductive foot 25 and the resistive component 22. The actuator cap 29 is coupled to the support structure 21. The conductive foot 25 is conformably coupled to the actuator cap 29. Preferably, the actuator cap 29 positions the conductive foot 25 in close proximity to the resistive component 22 where a horizontal user input force will place the conductive foot 25 in contact with the resistive component 22. Optionally, the actuator cap 20 can position the conductive foot 25 in contact with the resistive component 22. The resistive component 22 is coupled to the support structure 21. The support structure 21 preferably is printed circuit board (PCB) which contains electrical contacts with the resistive component 22 to pick up electrical signals that are used to determine user input into the navigational device. The conductive foot 25 comprises of a contact surface 23 and a coupled joystick 24. The actuator cap 29 is comprises a user contact area 28 and a surrounding bellows 26. The actuator cap 29 is preferably formed of a flexible material to allow user input forces to move the conductive foot 25 into contact with the resistive component 22, and to position the conductive foot 25 at differing contact points on the resistive component 22. The differing contact point form one or more electrical signal outputs 30 that are used to determine the user input. The bellows 26 of the actuator cap 29 preferably has a conductive contact area 27 that is electrically in contact with the contact surface 23 of the conductive foot 25 and is in electrical contact with the support structure 21 where a voltage can be applied. Preferably, the resistive component 22 is formed of a resistive resilient material.

Figure 4:
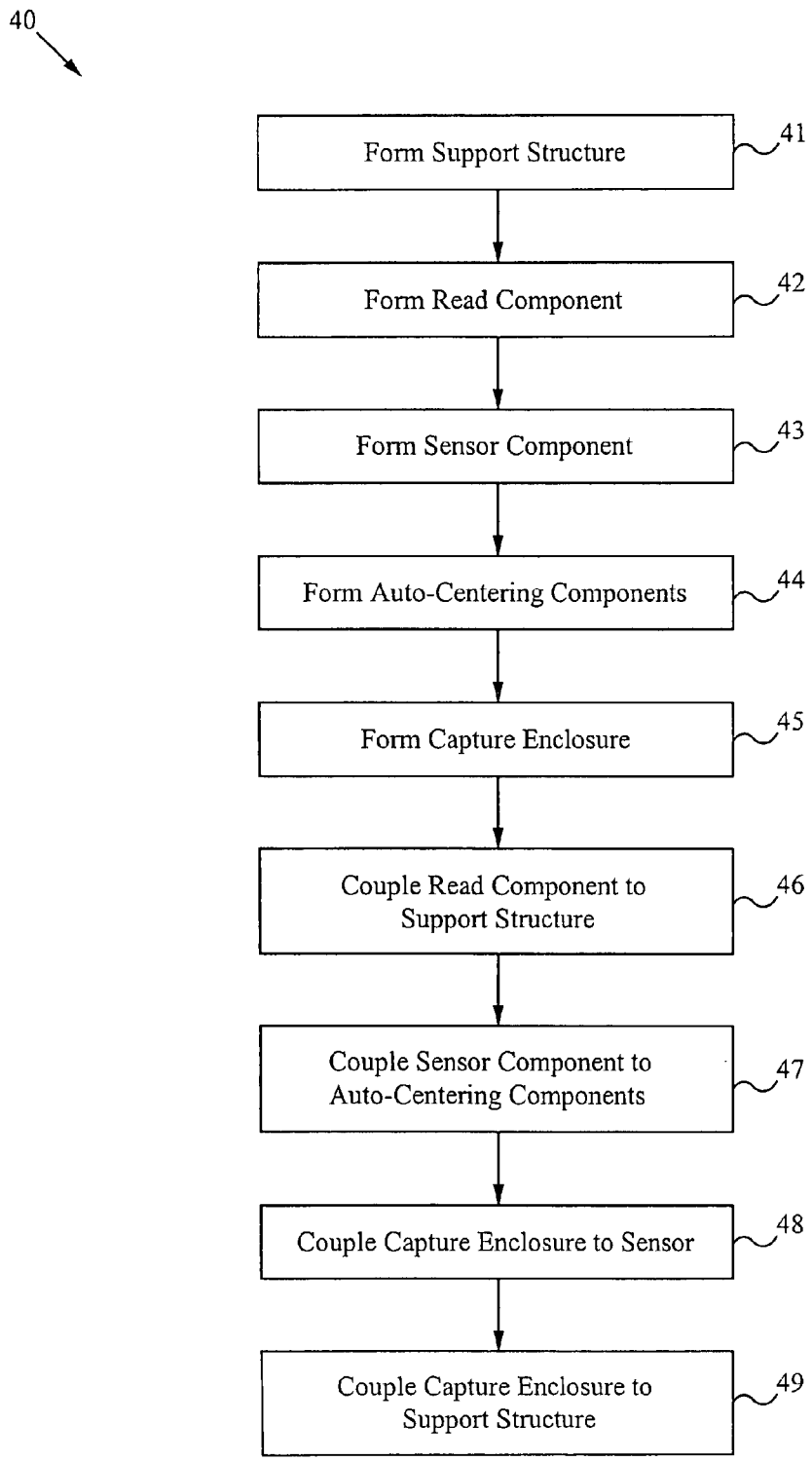
FIG. 4 is a illustration of the steps for the method of manufacture of a ultra-thin navigational device.

FIG. 4 illustrates the method of manufacture 40 of an ultra-thin navigational device. In step the 41, a support structure is formed. The support structure is typically a PCB (printed circuit board). The support structure can contain the electrical traces that can bring a voltage to the sensor component and provide output signals from the read components. The support structure should be sufficiently strong to take the vertical and lateral forces generated by the user input, typically a user's finger. In the step 42, a read component is formed. The read components can be formed separately and then subsequently coupled to the support structure. Alternatively, the read components can be formed simultaneously with the coupling to the support structure. The read components can comprises one or more areas of varying shapes, each electrically isolated from each other. The shape of the read component will be determined by the desired signal response. In the step 43, a sensor component is formed. Preferably, the sensor component is round but can be formed to take on any other shape. Preferably, the sensor component is made of a resistive resilient material. Optionally, a haptic feed device is coupled to the sensor component. Alternatively, the haptic feedback device can integrally be formed with the sensor component. In one embodiment, the haptic feedback component is formed simultaneously with the forming of the sensor component. In another embodiment, the haptic feedback component is formed separately from the sensor component forming and is coupled at a later time. In the step 43, the auto-centering components are formed. These components can be formed to be flexible or alternatively to be rigid out of materials including memory wire; elastic bands; polymeric springs; shape memory polymers; or muscle wire. In the step 45, a capture enclosure is formed with an aperture. The capture enclosure can be of any desired shape and the aperture can be of a differing shape. Preferably the aperture is of a shape and size that allows the user to make sufficient movements over the sensor component for the read components to generate signals useful for determining the user input. The capture enclosure can be formed out of metal, plastic, or any other suitable material. The capture enclosure can be formed in any color or have any number of decorative patterns or shapes. In the step 46, the read component is coupled to the support structure. As mentioned before, the coupling can occur simultaneously with the forming of the read component such as by the etching of a metal layer on a PCB board. Alternatively, the read components are formed as separate components and attached to the support structure (PCB board). This coupling includes any connections required to couple the read component with the signal lines on the PCB board to get the signals out to an array of terminals. In the step 47, the auto-centering component is coupled to the sensor component. The auto-centering component is preferably coupled via a bonding method such as adhesive or by a fastener including but not limited to a clamp, screw, or rivet. In the step 48, the capture enclosure is capture enclosure is coupled to the sensor component. This coupling can be directly through the attachment of the sensor component to the capture enclosure around the edge of the aperture or indirectly such as through the coupling of the auto-centering components to the capture enclosure. Preferably the coupling is provided through the use of an adhesive but other mechanical means can be provided. In the step 49, the capture enclosure is coupled to the support structure after the sensor component is coupled to the capture enclosure. Preferably the support structure is coupled with an adhesive but other means such as soldering, brazing, mechanical means such as clamps, screws, and rivets are contemplated.

One skilled in the art will appreciate that the order of steps of manufacture in FIG. 4 are for illustrative purposes and that the order of some steps can be changed or eliminated and still be within the scope of the invention.

Resistive resilient material components of various embodiments of the present invention are selected from a group consisting of but not limited to: silicone; silicone derivatives; rubber; rubber derivatives; neoprene; neoprene derivative; elastomers; elastomer derivatives; urethane; urethane derivatives; shape memory materials; polymer films, conducive films, PET film, conductive inks, conductive polymers, conductive coatings; polymer coatings; conductive coatings; conductive polymer coatings; combinations or derivatives thereof.

Variable Resistance Devices

The variable resistance devices of the present invention include components made of resistive resilient materials.

One example of a variable resistance device is a durometer rubber having an electrically conductive material imbedded therein such as a carbon or a carbon-like material. The resistive resilient material advantageously has a substantially uniform or homogeneous resistivity, which is typically formed using very fine resistive particles that are mixed in the rubber for a long period of time in the forming process. The resistive property of resistive resilient material is typically measured in terms of resistance per a square block or sheet of the material. The resistance of a square block or sheet of a resistive resilient material measured across opposite edges of the square is constant without regard to the size of the square. This property arises from the counteracting nature of the resistance-in-series component and resistance-in-parallel component which make up the effective resistance of the square of material. For instance, when two square blocks of resistive resilient material each having a resistance of 1 ohm across opposite edges are joined in series, the effective resistance becomes 2 ohms due to the doubling of the length. By coupling two additional square blocks along the side of the first two square blocks to form a large square, the effective resistance is the reciprocal of the sum of the reciprocals. The sum of the reciprocals is $1/(½ \text{ ohm} + ½ \text{ ohm})=1$ ohm. Thus, the effective resistance for a large square that is made up of 4 small squares is 1 ohm, which is the same as the resistance of each small square. The use of the resistance-in-series or straight path resistance component and the resistance-in-parallel or parallel path resistance component of the resistive resilient material is discussed in more detail below.

The resistance per square of the resistive resilient material employed typically falls within the range of about 10-100 ohms per square. In some applications, the variable resistance device has a moderate resistance below about 50,000 ohms. In certain applications involving joysticks or other pointing devices, the range of resistance is typically between about 1,000 and 25,000 ohms. Advantageously, the resistive resilient material is able to be formed into any desirable shape, and a wide range of resistivity for the material is able to be obtained by varying the amount of resistive particles embedded in the resilient material.

The resistive response of a variable resistance device made of a resistive resilient material can be attributed to three categories of characteristics: material characteristics, electrical characteristics, and mechanical characteristics.

A. Material Characteristics

The resistance of a resistive resilient material increases when it is subjected to stretching and decreases when it is subjected to compression or pressure. The deformability of the resistive resilient material renders it more versatile than materials that are not as deformable as the resistive resilient material. The resistance of a resistive resilient material increases with an increase in temperature and decreases with a decrease in temperature.

B. Electrical Characteristics

The effective resistance of a resistive resilient component is generally the combination of a straight path resistance component and a parallel path resistance component. The straight path resistance component or straight resistance component is analogous to resistors in series in that the straight resistance component between two contact locations increases with an increase in distance between the two contact locations, just as the effective resistance increases when the number of discrete resistors which are joined in series increases. The parallel path resistance component is analogous to resistors in parallel in that the parallel path resistance component decreases when the number of parallel paths increases between two contact locations due to changes in geometry or contact variances, just as the effective resistance decreases when the number of discrete resistors joined in parallel increases, representing an increase in the amount of parallel paths.

To demonstrate the straight resistance characteristics and parallel path resistance characteristics, specific examples of variable resistance devices are described herein. In some examples, straight resistance is the primary mode of operation. In other examples, parallel path resistance characteristics are dominant.

1. Straight Path Resistance

One way to provide a variable resistance device that operates primarily in the straight resistance mode is to maintain the parallel path resistance component at a level which is at least substantially constant with respect to changes in the distance between the contact locations. The parallel path resistance component varies with changes in geometry and contact variances. The parallel path resistance component can be kept substantially constant if, for example, the geometry of the variable resistance device, the contact locations, and the contact areas are selected such that the amount of parallel paths between the contact locations remains substantially unchanged when the contact locations are moved.

Figure 5A:
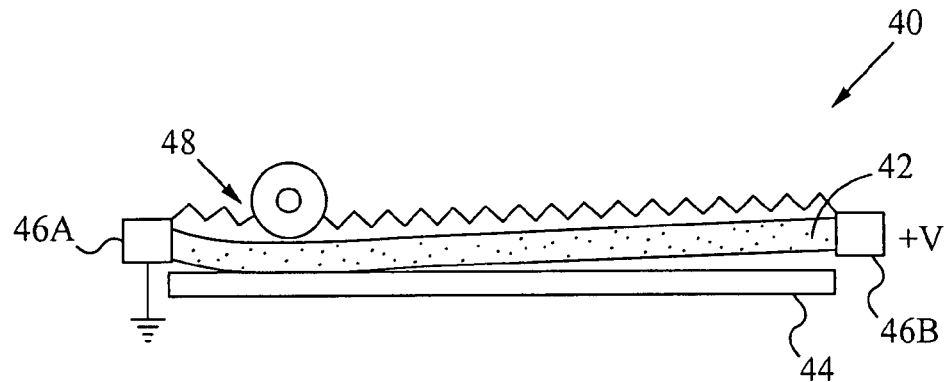
FIGS. 5A-C show several view of a variable resistance device exhibiting effective straight resistance characteristics in accordance with one embodiment of the present invention.
Figure 5B:
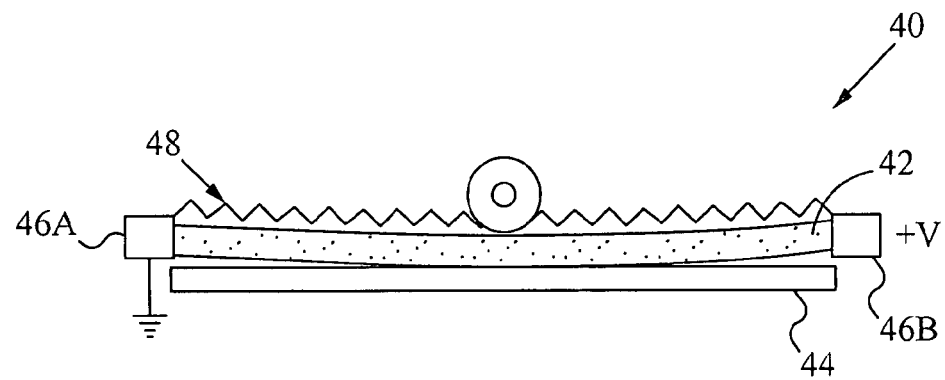
Figure 5C:
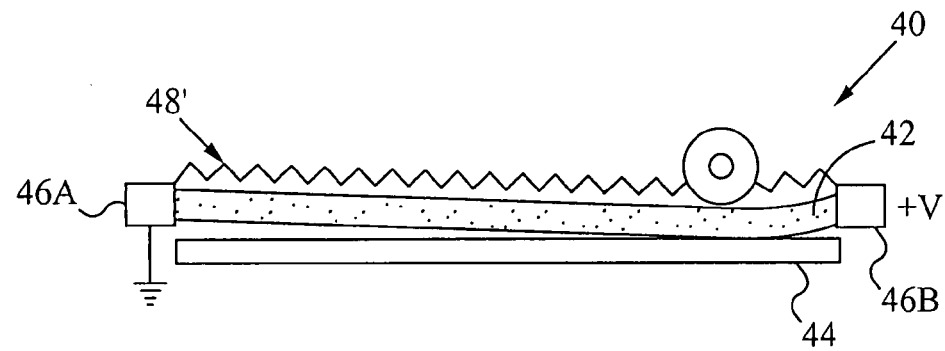
Figure 5D:
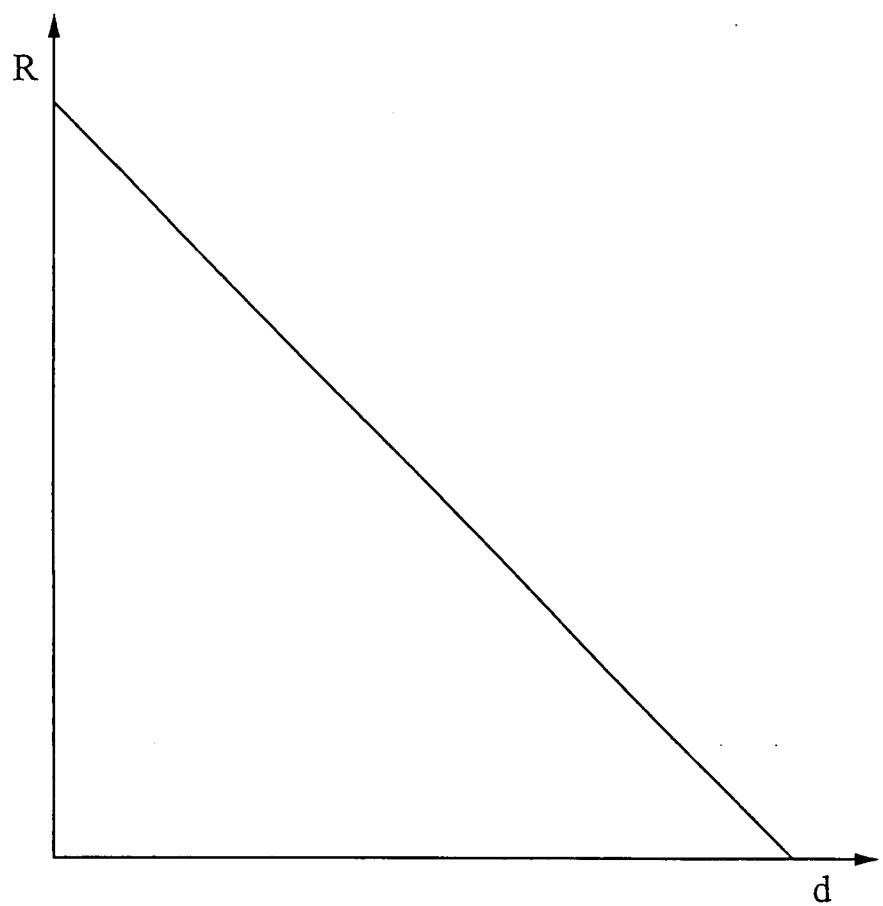
FIG. 5D is a plot of the effective resistance as a function of the contact location for the variable resistance device of FIGS. 5A-C.

One example of a device having parallel paths is a potentiometer 40 shown in FIGS. 5A-C. In the potentiometer 10, a resistive resilient transducer 42 is disposed adjacent and generally parallel to a conductor or conductive substrate 44. The resistive resilient transducer 42 is supported at two ends by end supports 46A, 46B, and is normally spaced from the conductor 44 by a small distance. A roller or wheel mechanism 48 is provided for applying a force on the transducer 42 to deflect the transducer 42 to make contact with the conductor 44 at different locations between the two ends of the transducer 14, as illustrated in FIGS. 5A-5C. In this embodiment, one end of the transducer 42 adjacent to the first end support 46A is grounded and the other end adjacent to the second end support 46B is energized with an applied voltage V. As the roller mechanism 48 deflects the transducer 42 to contact the conductor 44 at different locations, voltage measurements taken along the length of the transducer 42 increases as the contact location approaches the end support 46B, the end with the voltage V. Also, resistance readings R taken at the contact locations d vary between the two ends of the transducer 42. The value d varies between a value at the support 16A and a value at the support 16B, as shown in the plot in FIG. 5D.

Figure 6:
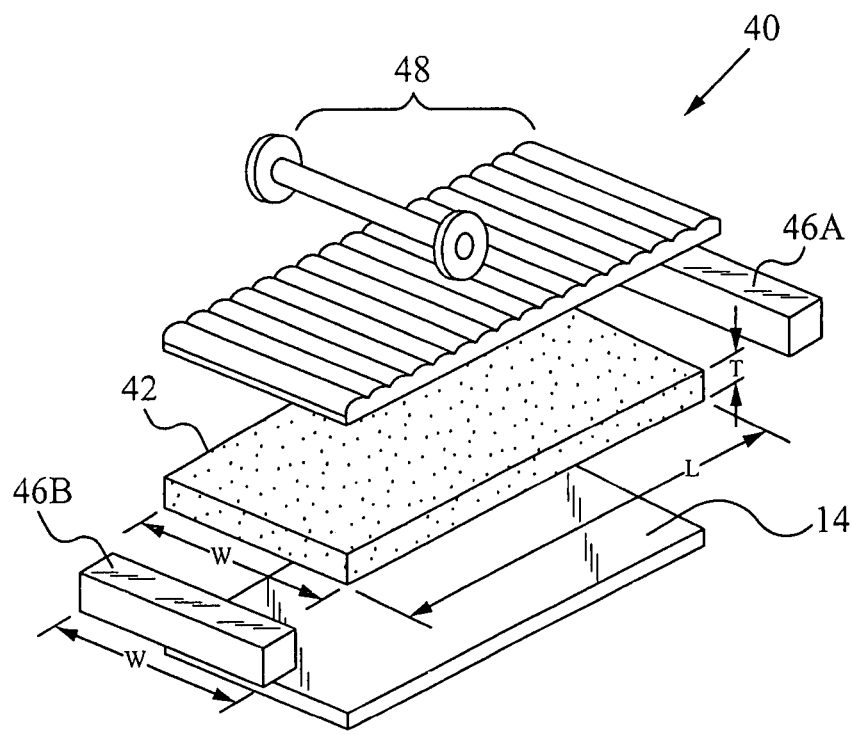
FIG. 6 is a perspective view of the variable resistance device of FIGS. 5A-C.

FIG. 6 is an exploded isometric view of the potentiometer 40 of FIGS. 5A-5C. Throughout this Specification, like-numbered elements refer to the same element. FIG. 6 shows that the transducer 42 and conductor 44 have generally constant widths and the roller mechanism 48 is set up so that the contact area between the transducer 42 and the conductor 44 remains generally constant at different contact locations. The contact area preferably extends across the entire width of the transducer 42 which amounts to a substantial portion (almost half) of the perimeter of the cross-section of the transducer 42 at the contact location. The resistive resilient transducer 42 has a substantially uniform cross-section, and the resistive resilient material preferably has substantially uniform resistive properties. The voltage V is applied at the end of the transducer 42 substantially across its entire cross-section. In one embodiment, this is done by capping the entire end of the transducer 42 with a conductive cap or conductive end support 46B and applying the voltage through the conductive end support 46B. The other end of the transducer 42 is grounded, preferably also across the entire cross-section, for instance, by capping the end with a grounded conductive end support 46A. Alternatively, this end near the end support 46A is energized with a voltage different from the voltage V, thereby creating a voltage differential between the two ends of the transducer 42. Referring to FIG. 6, in a specific embodiment, the resistive resilient transducer 42 has a thickness T which is significantly smaller than its width W and length L (e.g., the width is at least about 5 times the thickness), so that the transducer 42 is a thin strip, which is flat and straight in the embodiment shown.

Current flows from the applied voltage end of the transducer 42 (adjacent to 46B) to the grounded end of the transducer 42 (adjacent to 46A) via parallel paths that extend along the length L of the transducer 42. For the variable resistance device 40, the contact area between the resistive resilient transducer 42 and the conductor 44 is substantially constant and the amount of parallel paths remains substantially unchanged as the contact location is moved across the length of the transducer. As a result, the parallel path resistance component is kept substantially constant, so that the change in the effective resistance of the device 40 due to a change in contact location is substantially equal to the change in the straight resistance component. The straight resistance component typically varies in a substantially linear fashion with respect to the displacement of the contact location because of the uniform geometry and homogeneous resistive properties of the resistive resilient material (see FIG. 5D).

Figure 7:
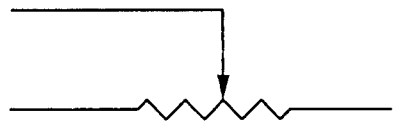
FIG. 7 is a schematic view of the variable resistance device of FIGS. 5A-C.

FIG. 7 is a schematic representation of the potentiometer 40 of FIGS. 5A-C.

Figure 8:
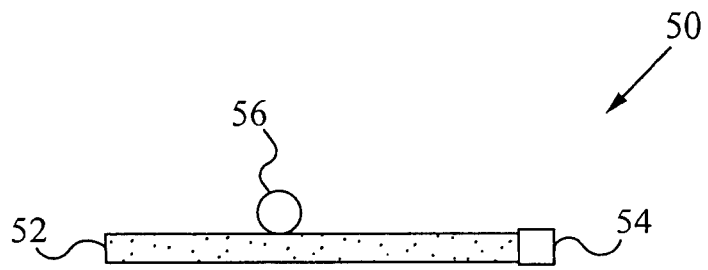
FIG. 8 is a side cross-sectional view of a variable resistance device exhibiting effective straight resistance characteristics in accordance with another embodiment of the invention.

Another variable resistance device 50 which also operates primarily on straight resistance principles is shown in FIG. 8. The device 50 includes a generally longitudinal resistive resilient member 52 which is substantially uniform in cross-section. As one example, the member 52 is generally similar to the resistive resilient transducer 42 in FIG. 6. One end of the resistive resilient member 52 is coupled to a first conductor 54, preferably across substantially the entire cross-section of the resilient member 52. A second conductor 56 makes movable contact with the resistive resilient member 52 along its length in the direction shown by the arrows to define a variable distance with respect to the first conductor 54. In this embodiment, the movable conductor 56 includes a roller with a curved surface which makes rolling contact on the surface of the resistive resilient member 52. The contact area between the movable conductor 56 and the resistive resilient member 52 is substantially constant, and preferably extends across the entire width of the member 52, which amounts to a substantial portion (almost half) of the perimeter of the cross-section of the member 52 at the contact location. In this way, the amount of parallel paths between the first conductor 54 and the second conductor 56 is substantially unchanged during movement of the second conductor 56 relative to the first conductor 54. The effective resistance of the variable resistance device 50 exhibits straight resistance characteristics, and increases or decreases when the variable distance between the first conductor 54 and the second conductor 56 increases or decreases respectively. If the resistive properties of the resistive resilient material are substantially uniform, the effective resistance varies substantially linearly with respect to changes in the distance between the first conductor 54 and the second conductor 56 in a manner similar to that shown in FIG. 5D.

Figure 9A:
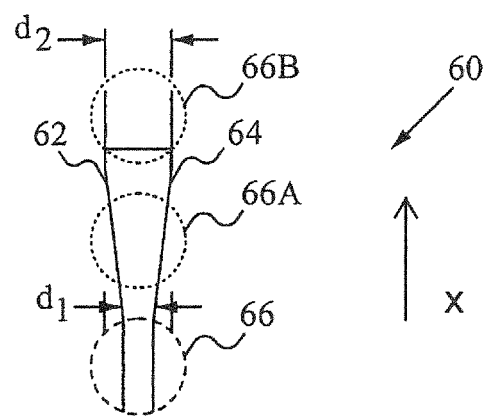
FIG. 9A is a top view of a variable resistance device exhibiting effective straight resistance characteristics in accordance with another embodiment of the invention.
Figure 9B:
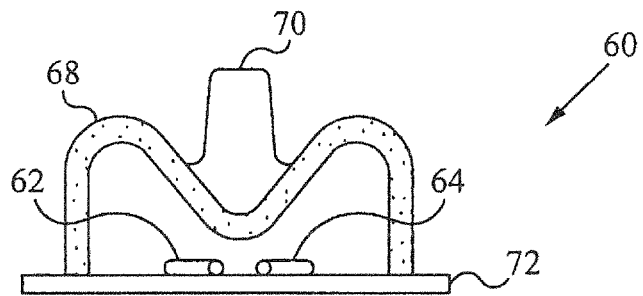
FIG. 9B is a side cross-sectional view of the variable resistance device of FIG. 8A.

Another example of a variable resistance device 60, shown in FIGS. 9A and 9B, employs two conductors 62, 64 in tandem. The conductor surfaces of the two conductors 62, 64 which are provided for making contact with a resistive surface or footprint 66 are spaced from each other by a variable distance. In the embodiment shown, the conductors 62, 64 are longitudinal members with substantially constant widths, and the distance between them increases from one end of each conductor 62, 64 to the other end. The resistive footprint 66 movably contacts the first conductor surface of the first conductor 62 over a first contact area and the second conductor surface of the second conductor 64 over a second contact area. FIG. 9A shows movement of the footprint 66 to positions 66A, 66A. The first contact area and second contact area, respectively, remain substantially constant during movement of the footprint 66 to positions 66a, 66b in the embodiment shown, and the resistive footprint 66 is substantially constant in area and circular in shape. FIG. 9B shows an embodiment of a resistive resilient member 68 which provides the circular resistive footprint 66. The resistive resilient member 68 includes a curved resistive surface 68 which is manipulated by a stick or joystick 70 to make rolling contact with the conductors 62, 64.

In the embodiment shown in FIGS. 9A and 9B, the conductors 62, 64 are disposed on a substrate 72, and the resistive resilient member 68 is resiliently supported on the substrate 72. When a force is applied on the joystick 70 to push the resistive resilient member 68 down toward the substrate 72, it forms the resistive footprint 66 in contact with the conductors 62, 64. When the force shifts in the direction of the conductors 62, 64, the footprint 66 moves to locations 66A, 66B. When the force is removed, the resilient resistive resilient member 68 is configured to return to the rest position shown in FIG. 9B above and not in contact with the conductors 62, 64. The resistive resilient member 68 preferably has a thickness which is substantially less than a square root of the area of the resistive footprint 66. As one example, the thickness is less than about 1/5 of the square root of the area of the resistive footprint 66.

The resistive footprint 66 bridges across the two conductor surfaces defined by an average distance over the footprint 66. The use of an average distance is necessary because the distance is typically variable within a footprint. Given the geometry of the variable resistance device 60 and the contact locations and generally constant contact areas between the conductors 62, 64 and the footprint 66 of the resistive resilient member 68, the amount of parallel paths between the two conductors 62, 64 is substantially unchanged. As a result, the change in the effective resistance is substantially governed by the change in the straight resistance component of the device 60, which increases or decreases with an increase or decrease, respectively, of the average distance between the portions of the conductor surfaces of the two conductors 62, 64 which are in contact with the resistive footprint 66. If the average distance varies substantially linearly with displacement of the resistive footprint 66 relative to the conductors 62, 64 (e.g., from $d_1$ to $d_2$ as shown for a portion of the conductors 62, 64 in FIG. 9a), and the resistive properties of the resistive resilient material are substantially constant, then the effective resistance also varies substantially linearly with the displacement of the footprint 66. Alternatively, a particular nonlinear resistance curve can result by arranging the conductors 62, 64 to define a specific variation in the average distance between them (e.g., logarithmic variations).

2. Parallel Path Resistance

Figure 10A:
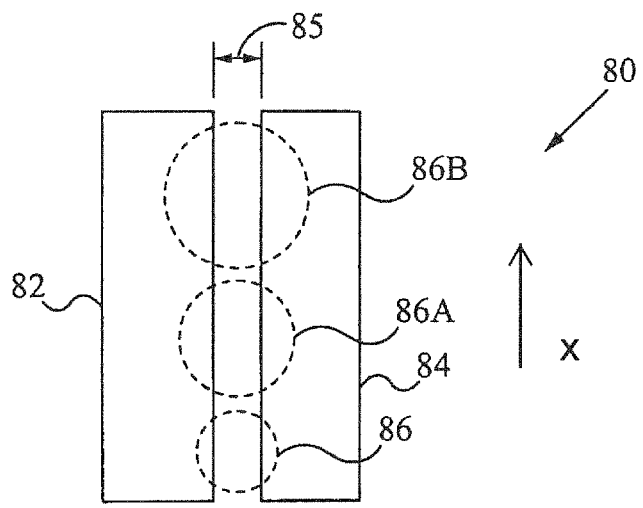
FIG. 10A is a top view of a variable resistance device exhibiting effective parallel path resistance characteristics in accordance with one embodiment of the invention.
Figure 10B:
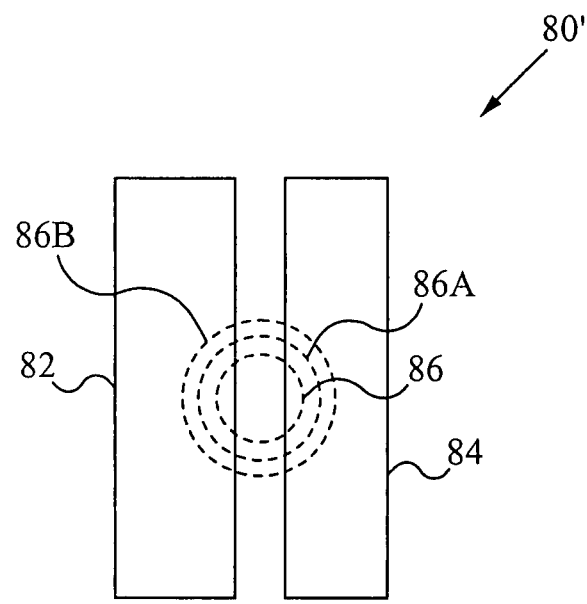
FIG. 10B is a top view of a variable resistance device exhibiting effective parallel path resistance characteristics in accordance with another embodiment of the invention.
Figure 11:
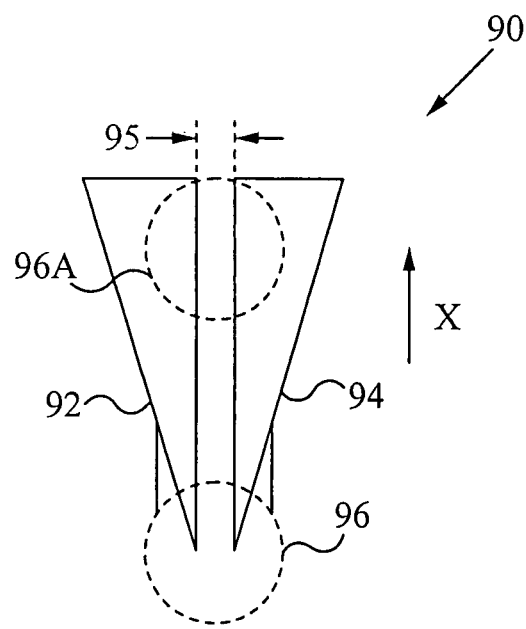
FIG. 11 is a top view of a variable resistance device exhibiting effective parallel path resistance characteristics in accordance with another embodiment of the invention.

The effective resistance of a device exhibits parallel path resistance behavior if the straight resistance component is kept substantially constant. FIGS. 10A, 10B, and 11 show examples of variable resistance devices that operate primarily in the parallel path resistance mode.

In FIG. 10a, the variable resistance device 80 includes a pair of conductors 82, 84 which are spaced from each other by a gap 85 which is substantially constant in size. The conductive surfaces of the conductors 82, 84 are generally planar and rectangular with straight edges defining the gap 85. The edges which define the gap can have nonlinear shapes in other embodiments. A resistive footprint 86 bridges across the gap between the conductors 82, 84 and changes in size to footprints 86A, 86B. In the embodiment shown, the resistive footprint 86 is circular and makes movable contact with the conductors 82, 84 in a generally symmetrical manner as it increases in size from footprint 86 to 86A and increases even more from footprint 86A to 86B.

Alternative footprint shapes and nonsymmetrical contacts are able to be employed in other embodiments. The movable contact is able to be produced by a resistive resilient member similar to the resistance member 68 shown in FIG. 9B with the joystick 70 for manipulating the movement of the footprint 86. The change in the area of the footprint 86 is able to be generated by increasing the deformation of the resistive resilient member 68. For instance, a larger force pushing downward on the joystick 70 against the resistive resilient member 68 produces greater deformation of the resistive resilient member 68 and thus a larger footprint size.

Because the gap 85 between the conductors 82, 84 which is bridged by the resistive footprint 86 is substantially constant, the straight resistance component of the overall resistance is substantially constant. The effective resistance of the variable resistance device 80 is thus dictated by the parallel path resistance component. The number of parallel paths increases with an increase in the contact areas between the resistive footprint from 86 to 86A, 86B and the conductors 82, 84. The parallel path resistance component decreases with an increase in parallel paths produced by the increase in the contact areas. Thus, the effective resistance of the device 80 decreases with an increase in the contact area from the footprint 86 to footprints 86A, 86B. In the embodiment shown in FIG. 10A, the contact areas between the resistive footprint 86 and the conductors 82, 84 increase continuously in the direction of movable contact from the footprint 86 to footprint 86A, and then from footprint 86A to footprint 86B. In such a configuration, the parallel path resistance component between the conductors 82, 84 decreases in the direction of the movable contact. The change in the contact areas is able to be selected to provide a particular resistance response for the variable resistance device 80 such as, for example, a resistance that decreases in a linear manner with respect to the displacement of the footprint 86 in the direction to footprints 86A, 86B.

Although FIG. 10A shows a moving resistive footprint 86, a similar variable resistance device 80' exhibits similar characteristics for a stationary footprint 86 that changes in size to footprints 86a, 86b as illustrated in FIG. 10B. Further, FIG. 10A shows a footprint 86 that maintains its circular shape, but a footprint in an alternative embodiment is able to change shape (e.g., from circular to elliptical) in addition to size.

In FIG. 11, a variable resistance device 90 includes a pair of conductors 92, 94 having non-uniformly shaped conductor surfaces for making contact with a resistive footprint 96. The conductor surfaces are spaced by a substantially constant gap 95 in a manner similar to that shown in FIG. 10A. The resistive footprint 96 is circular and makes movable contact with the conductor surfaces which are triangular in this embodiment. The resistive footprint 96 maintains a substantially constant size when it moves over the conductor surfaces in the direction X, from the footprint 96 to the footprint 96A. The device 90 is similar to the device 80 in FIG. 10A except for the triangular conductor surfaces and the substantially constant footprint size. As in the device 80 in FIG. 10A, the constant gap 95 in the device 90 produces a straight resistance component that is substantially constant. When the resistive footprint 96 moves relative to the conductors 92, 94 to footprint 96A, the contact areas between the footprint 96 and the conductors 92, 94 increase due to the shape of the triangular conductor surfaces, thereby increasing the amount of parallel paths and lowering the parallel path resistance component. The contact areas change in size in the device 90 of FIG. 10A due to variations in the footprint size, while the contact areas change in size in the device 90 of FIG. 11 due to variations in the shape of the conductor surfaces. As compared to the device 80 of FIG. 10A, the variable resistance device 90 represents a different way of selecting the geometry, contact locations, and contact areas to produce an alternative embodiment that operates similarly in the parallel path resistance mode.

Another way to ensure that a variable resistance device operates primarily in the parallel path resistance mode is to manipulate the geometric factors and contact variances such that the parallel path resistance component is substantially larger than the straight resistance component. In this way, the change in the effective resistance is at least substantially equal to the change in the parallel path resistance component.

Figure 12:
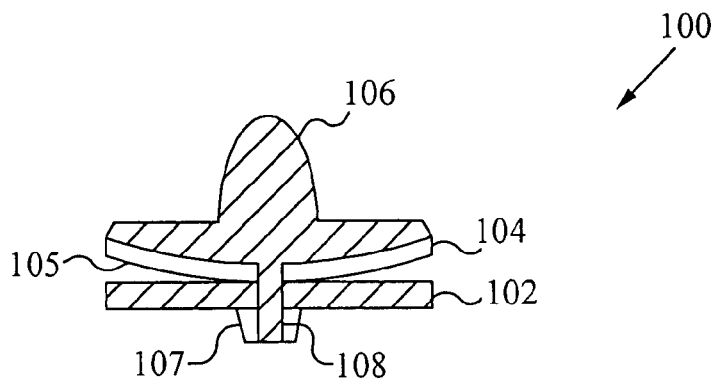
FIG. 12 is a partial side cross-sectional view of a variable resistance device exhibiting effective parallel path resistance characteristics in accordance with another embodiment of the invention.

An example of a variable resistance device in which the parallel path resistance component is dominant is a joystick device 100 shown in FIG. 12. The variable resistance joystick device 100 includes a conductive substrate 102, a resistive resilient transducer 104 having a curved resistive surface 105 in rolling contact with the surface of the conductive substrate 102, and a stick 106 coupled with the transducer 104 for moving the transducer 104 relative to the conductive substrate 102. A conductive spring 108 extends through an opening in the central region of the conductive substrate 102 and resiliently couples a center contact portion 109 (FIGS. 13A, 13B, and 13C) of the transducer 104 to a fixed pivot region 107 relative to the conductive substrate 102. The spring 108 is electrically insulated from the conductive substrate 102. In the embodiment shown, a voltage is applied through the conductive spring 108 to the center portion of the resistive resilient transducer 104. In one embodiment, the resistive resilient transducer 104 has a small thickness which is substantially smaller than the square root of the surface area of the resistive surface 105.

Figure 13A:
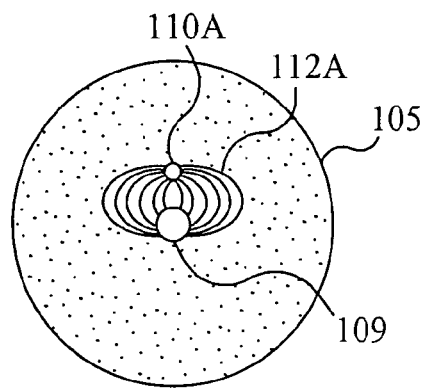
FIGS. 13A-C are schematic views illustrating parallel paths for different contact locations in the variable resistance device of FIG. 12.
Figure 13B:
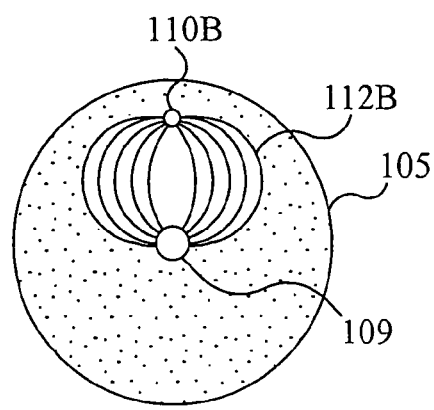
Figure 13C:
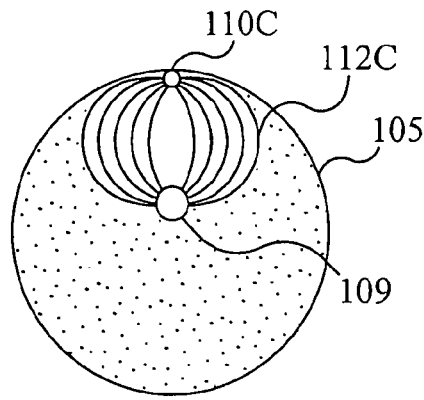

In operation, a user applies a force on the stick 106 to roll the transducer 104 with respect to the conductive substrate 102 while the spring 108 pivots about the pivot region 107. The resistive surface 105 makes movable contact with the surface of the conductive substrate 102. FIGS. 13A-C show several movable contact locations or footprints 110A, 110B, 110C on the resistive surface 105 of the transducer 104 at different distances from the contact portion 109 where the voltage is applied. Current flows from the conductive spring 108 to the center contact portion 109 of the transducer 104 through the resistive resilient material of the transducer 104 to the conductive substrate 102 at the contact location (110A, 110B, 110C) where the voltage is sensed. There will be a drop in voltage from the voltage source at the contact portion 109 to the contact location with the conductive substrate 102 as the current travels through the resistive resilient material of the transducer 104.

FIGS. 13A-C schematically illustrate parallel paths 112A-C on the resistive surface 105 between the contact portion 109 and the movable contact locations 110A-C. FIGS. 13A-C do not show the parallel paths through the body of the resistive resilient transducer 104 but only the parallel paths 112A-C over the resistive surface 105, which are representative of the amount of parallel paths through the body of the transducer 104 between the contact portion 109 and the movable contact locations 110A-C. The contact area sizes of the contact locations 110A-C preferably are substantially constant. The shape of the contact area typically is also generally constant.

In FIG. 13a, both the contact portion 109 for the applied voltage and the contact location 110A are disposed generally in a central region of the resistive surface 105 and away from the outer edge of the resistive surface 105. In this configuration, both the contact portion 109 and the contact location 110A are surrounded by resistive resilient material. The current flows from the contact portion 109 in an array of parallel paths 112A in many directions into the resistive resilient material of the transducer 104 surrounding the contact portion 109, toward the contact location 110A also from different directions surrounding the contact location 110A. In contrast, the straight resistance component between the contact portion 109 and the contact location 110A as defined by the distance between them is significantly smaller than the dominant parallel path resistance component. Due to the short distance between the contact portion 109 and the contact location 112A which limits the amount of resistive resilient material through which the current travels, the amount of parallel paths 112A is relatively small.

In FIG. 13B, the contact location 110B moves farther away from the contact portion 109, but still stays generally in a central region of the resistive surface 105 away from the outer edge of the resistive surface 105. Because the contact location 110$b$ is spaced farther from the contact portion 109, there is a larger amount of resistive resilient material and thus a larger amount of parallel paths 112B for the current to flow than in FIG. 13A. The increase in the number of parallel paths causes a decrease in the parallel path resistance component. The greater distance between the contact portion 109 and the contact location 110B produces an increase in the straight resistance component, but it is still a small component compared to the parallel path component due to the presence of the large amount of parallel paths which more than compensates for the increase in straight resistance. Therefore, the effective resistance decreases as the contact location 110B moves farther away from the fixed center contact portion 109.

Eventually the additional generation of parallel paths decreases as the distance increases between the contact portion 109 and the contact location increases. In the embodiment shown in FIG. 13C, this occurs when the contact location 110C approaches the edge of the resistive surface 105, where the contact location 110C is no longer surrounded by as much resistive resilient material as in FIGS. 13A and 13B. The resistive resilient material available for the parallel paths 112C is limited by geometric factors. Meanwhile, the straight resistance component continues to increase as a result of the increase in distance.

Figure 14:
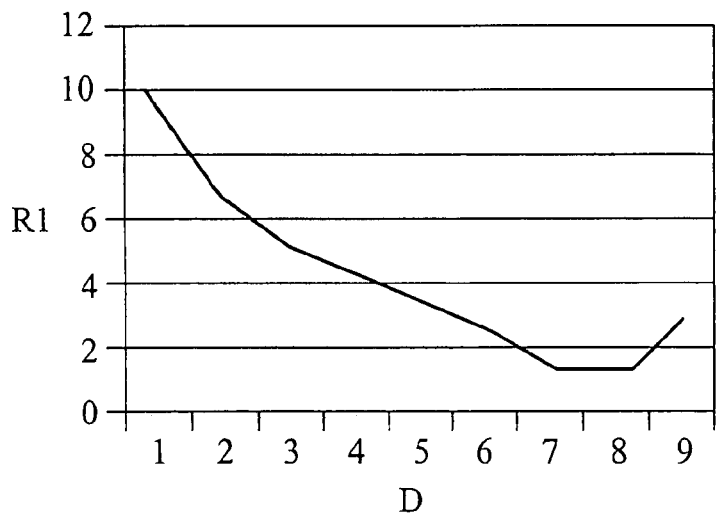
FIG. 14 is a plot of the effective resistance as a function of distance between contact locations for the variable resistance device of FIG. 12.

FIG. 14 is a plot of the effective resistance R as a function of the footprint distance D from the center contact portion 109 for the joystick device 100. The effective resistance R initially exhibits parallel path resistance characteristics, and decreases as the contact moves from the contact location 110A in FIG. 13A to the contact location 110B in FIG. 13B. A portion of the resistance curve in FIG. 14 is substantially linear. This occurs where the distance D between the center contact portion 109 and the contact location 110B is in the medium distance range between about 2.5 and 6.5 normalized with respect to the radius of the resistive surface 105. When the contact location 110C approaches the edge of the resistive surface 105 as shown in FIG. 13C, a cross-over occurs where the straight resistance component overtakes the parallel path resistance component and becomes the dominant component. This cross-over is seen in FIG. 14 as a rise in the effective resistance with an increase in footprint distance to about 7.5-8.5 near the edge of the resistive surface 105. The cross-over phenomenon is able to be used in certain applications as a switch activated by the movement of the contact location 112C toward the edge of the resistive surface 105.

Figure 15A:
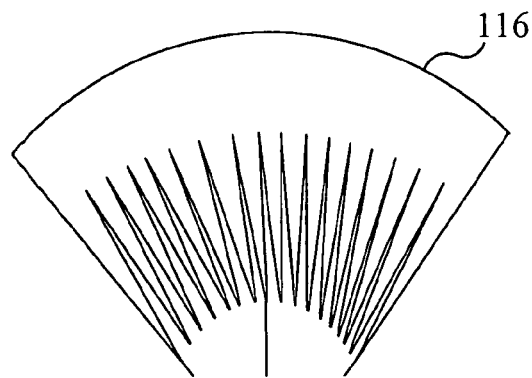
FIG. 15A is a schematic view of a conductive trace pattern of a segment of the substrate in the variable resistance device of FIG. 12 in accordance with another embodiment of the invention.
Figure 15B:
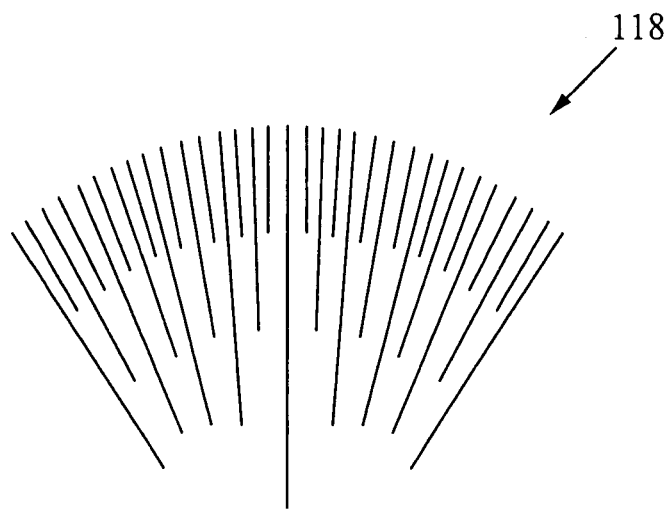
FIG. 15B is a schematic view of another conductive trace pattern of a segment of the substrate in the variable resistance device of FIG. 12 in accordance with another embodiment of the invention.

In FIG. 12, the surface of the conductive substrate 102 over which the resistive resilient transducer 104 rolls and makes movable contact is assumed to be divided into two or more segments (typically four) to provide directional movement in two axes. FIGS. 15A and 15B show segments of alternative conductive patterns that are able to be used to modify the resistance characteristics of the variable resistance device 100 in FIG. 12. FIG. 15A shows a continuous conductive pattern 116 on the substrate, while the FIG. 15B shows a conductive pattern 118 made up of individual conductive traces. In both cases, the amount of conductive material for contacting with the footprint of the resistive surface 105 increases as the contact location moves farther away from the center contact portion 109. Thus, the effective contact area between the resistive footprint and the conductive pattern 116, 118 increases in size as the footprint distance from the center contact portion 109 increases (even though the size of the footprint remains generally constant), so that the increase in the amount of parallel paths is amplified with respect to the increase in the footprint distance. As a result, the effective resistance exhibits more pronounced parallel path characteristics until the resistive footprint approaches the edge of the resistive surface 105. The embodiments in FIGS. 15A and 15B introduce the additional factor of varying the effective contact area to manipulate the effective resistance characteristics of the variable resistance device 100.

As discussed above, the straight path resistance component becomes dominant as the contact location 112C of the resistive footprint approaches the edge of the resistive surface 105 as shown in FIGS. 13C and 14. A variable resistance device 120, shown in exploded view in FIG. 16, makes use of this property. The device 120 includes a thin sheet of a resistive resilient member 122 which is rectangular in the embodiment shown. One corner 124 of the member 122 is energized with an applied voltage V, while another corner 126 is grounded. Alternatively, the corner 126 is energized with a voltage different from V to create a voltage differential across the member 122. A conductive sheet 128 is disposed generally parallel with and spaced above the member 122. A force is able to be applied via a pen 129 or the like to bring the member 122 and the conductive sheet 128 in contact at various contact locations.

In this variable resistance device 120, the straight resistance component is dominant, partly because the formation of parallel paths is limited by the lack of resistive material surrounding the corners 124, 126. The number of parallel paths remains limited even when the contact with the conductive sheet 128 is made in the center region of the resistive resilient member 122 because the voltage is applied at the corner 124. In contrast, the application of the voltage in the center contact portion 109 in the device 100 shown in FIG. 12 allows current to flow in many directions into the resistive resilient material that surrounds the center contact portion 109.

The above examples illustrate some of the ways of controlling the geometry and contact variances to manipulate the straight resistance and parallel path resistance components to produce an effective resistance having certain desired characteristics.

It will be appreciated variable resistances in accordance with the present invention are able to be used to generate signals that correspond, for example, to locations on a grid. These signals are generally coupled to analog-to-digital converters as input to cell phones, games, and other devices that rely on positional signals and haptic events, to name only a few of many possible uses.

C. Mechanical Characteristics

Another factor to consider when designing a variable resistance device is the selection of mechanical characteristics for the resistive resilient member and the conductors. This includes, for example, the shapes of the components and their structural disposition that dictate how they interact with each other and make electrical contacts.

Figure 16:
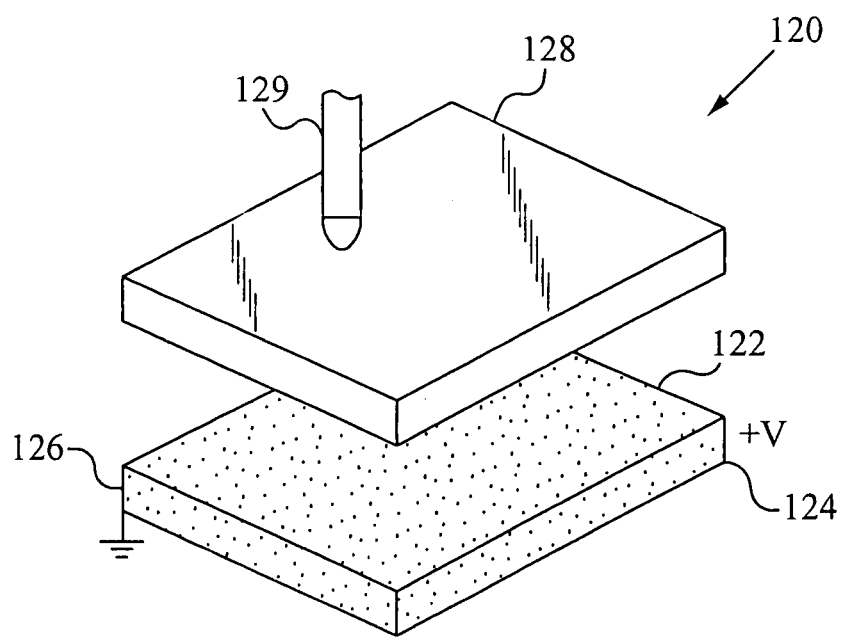
FIG. 16 is an exploded perspective view of a variable resistance device exhibiting effective straight resistance characteristics in accordance with another embodiment of the invention.

As some examples, the use of a resistive resilient strip 42 to form a potentiometer is illustrated in FIGS. 5A-C and 6. The use of conductive bars 62, 64 are shown in FIGS. 9A and 9B. A flat sheet of resistive resilient sheet 102 is illustrated in FIG. 16. In the configuration of FIG. 16, typically two corners of the resilient sheet 122 are energized with voltage potentials and the remaining two corners are grounded. A voltage is read through the contact between the conductive sheet 128 and the resistive resilient sheet 122 and processed to determine the contact location over an X-Y Cartesian coordinate system using methods known in the art. The variable resistance device 120 of this type is applicable, for example, as a mouse pointer or other control interface tool.

Resistive resilient members in the form of curved sheets are shown in FIGS. 9B and 12. The examples of FIGS. 9B and 12 represent joysticks or joystick-like structures, but the configuration is able to be used in other applications such as pressure sensors. For instance, the force applied to a curved resistive resilient sheet is able to be caused by a variable pressure and the contact area between the curved resistive resilient sheet and a conductive substrate is proportional to the level of the applied pressure. In this way, the change in resistance is related to the change in pressure so that resistance measurements are able to be used to compute the applied pressure.

Figure 17:
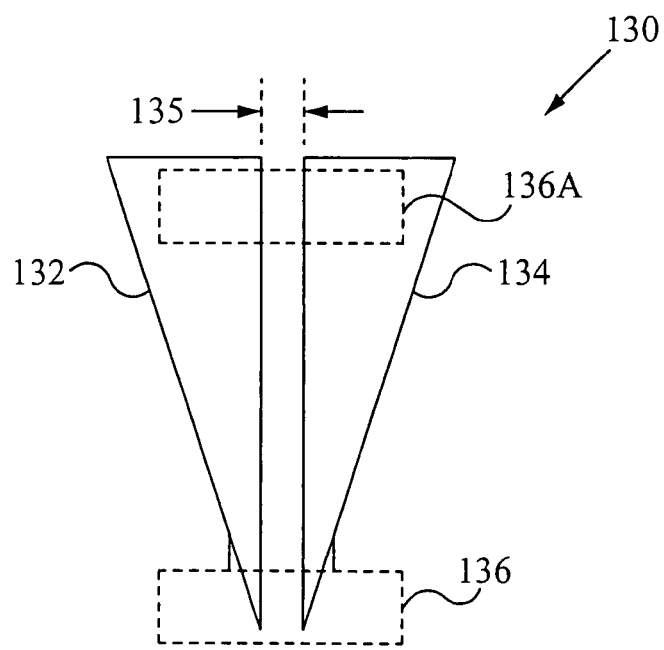
FIG. 17 is a schematic view of a variable resistance device exhibiting effective parallel path resistance characteristics with a rectangular resistive footprint in accordance with another embodiment of the invention.

Another mechanical shape is a rod. In FIG. 8, the example of a conductive rod 56 is shown. A rod produces a generally rectangular footprint. The rod configuration is also able to be used for a resistive resilient member to produce a rectangular resistive footprint. An example is the variable resistance device 130 shown in FIG. 17, which is similar to the device 90 of FIG. 11. The device 130 has a similar pair of conductors 132, 134 spaced by a similar gap 135. In FIG. 17, however, the resistive footprints 136, 136A are rectangular as opposed to the circular footprints 96, 96A in FIG. 11. The change in the shape of the footprint 106 produces a different resistance response, but the effective resistance is still governed by the parallel path resistance component as in the device 90 of FIG. 117.

Figure 18:
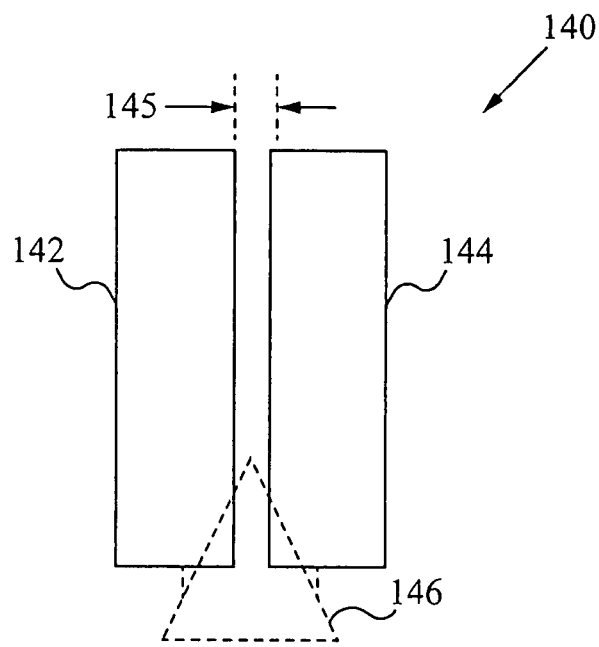
FIG. 18 is a schematic view of a variable resistance device exhibiting effective parallel path resistance characteristics with a triangular resistive footprint in accordance with another embodiment of the invention.

Yet another mechanical shape for a footprint is that of a triangle, such as produced by a cone or a wedge. In FIG. 18, a variable resistance device 140 is similar to the device 80 in FIG. 9, and includes a pair of conductors 142, 144 spaced by a gap 145. Instead of a circular resistive footprint 86 that changes in size, the device 140 uses a triangular resistive footprint 146 that makes movable contact with the conductors 142, 144 in the direction shown by the arrow X. As a result, the contact areas between the resistive footprint 146 and the conductors 142, 144 increase in the X direction even though the footprint 146 is constant in size, creating a similar effect as that illustrated in FIG. 10. In this embodiment, due to the substantial linear increase in contact areas, the resistance response is also substantially linear.

Figure 19:
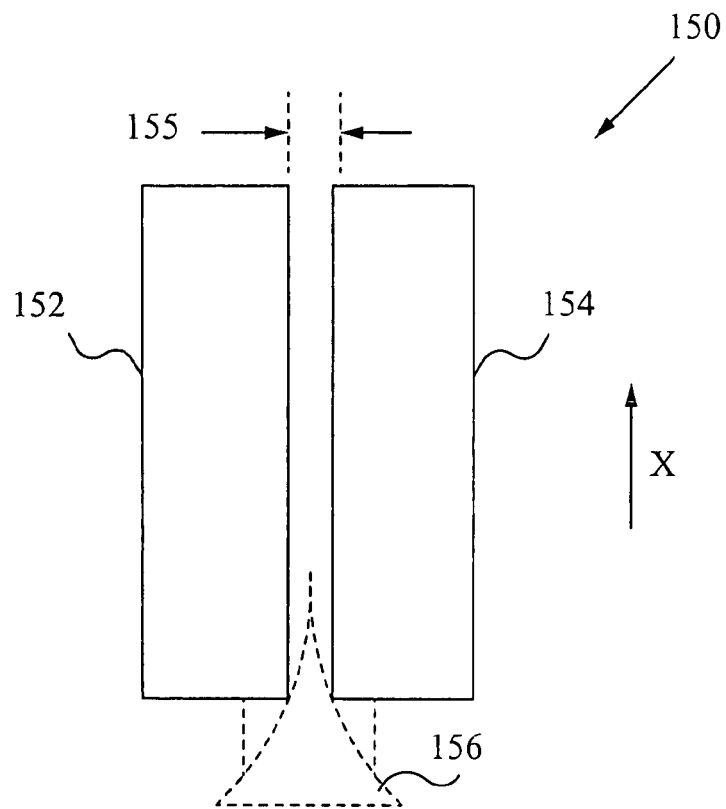
FIG. 19 is a schematic view of a variable resistance device exhibiting effective parallel path resistance characteristics with a logarithmic resistive footprint in accordance with another embodiment of the invention.
Figure 20:
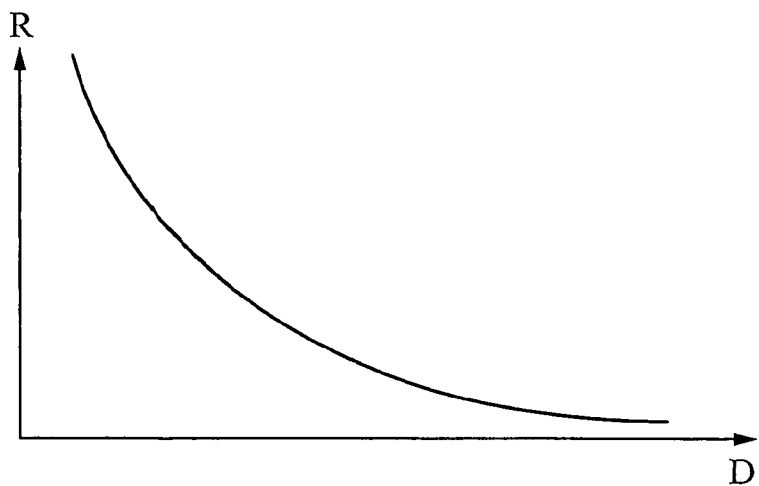
FIG. 20 is a plot of the effective resistance as a function of displacement of the resistive footprint for the variable resistance device of FIG. 19.

In the variable resistance device 150 of FIG. 19, the shape of the triangular resistive footprint 156 is modified to produce a logarithmic resistance response when it makes movable contact with the conductors 152, 154 separated by a gap 155 in the direction X. The change in resistance R is proportional to the logarithm of the displacement D of the resistive footprint 156 in the direction X. A plot of the change in resistance R versus the displacement D of the resistive footprint 156 is shown in FIG. 20.

Figure 21:
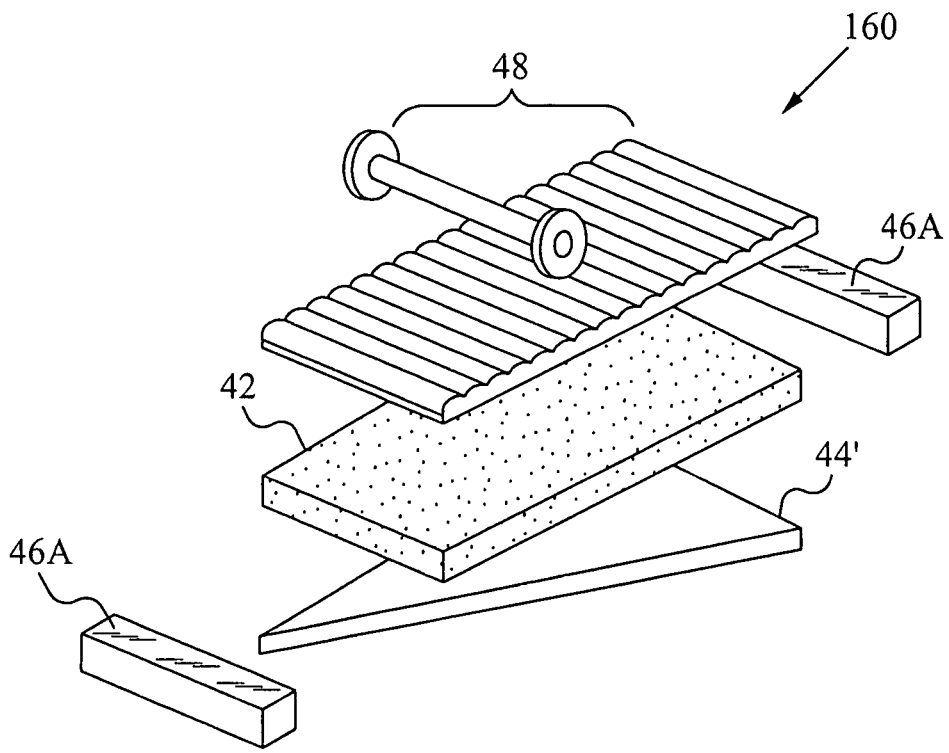
FIG. 21 is an exploded perspective view of a variable resistance device exhibiting effective straight resistance characteristics with a logarithmic conductor footprint in accordance with another embodiment of the invention.
Figure 22:
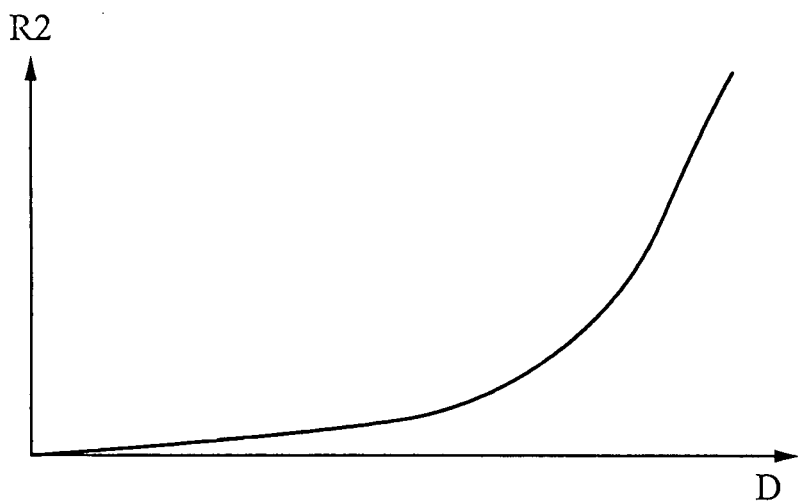
FIG. 22 is a plot of the effective resistance as a function of contact location between the resistive resilient transducer and the conductor footprint for the variable resistance device of FIG.

A logarithmic resistance response is also able to be produced using the embodiment of FIGS. 5A-C and 6 if the rectangular conductive member 14 is replaced by a generally triangular conductive member 44', as illustrated in the variable resistance device 160 of FIG. 21. The conductor 46a is grounded while the conductor 46b is energized with a voltage V. FIG. 22 shows a plot of the resistance R2 versus the distance in the direction Y, the distance of the contact location between the resistive resilient transducer 42 and the conductive member 44 measured from the end of the transducer 42 adjacent the conductor 46b where the voltage V is applied.

As illustrated by the above examples, resistive resilient materials are able to be shaped and deformed in ways that facilitate the design of variable resistance devices having a variety of different geometries and applications. Further-more, devices made of resistive resilient materials are often more reliable. For instance, the potentiometer 40 shown in FIGS. 5A-C and 6 provides a resistive resilient transducer 42 having a relatively large contact area as compared to those in conventional devices. The problem of wear is lessened. The large contact area also renders the potentiometer 40 less sensitive than conventional devices to contamination such as in the presence of dust particles.

In accordance with the present invention, variable resistance devices are able to be configured to produce variable resistance zones. By configuring multiple variable resistance devices, larger zones (e.g., areas that can track movement, such as a touchpad on a gaming devices) can be formed by merely combining the discrete variable resistance devices.

The invention claimed is:

1. A navigational pointer device comprising:
   a support structure component;
   a plurality of read components carried by the support structure component and comprising
      a continuous round central component, and
      a plurality of peripheral components coupled to and extending outwardly from the continuous round central component, the plurality of peripheral components being spaced apart equally about the continuous round central component, and each having a solid triangular shape that has an apex adjacent the continuous round central component so that the plurality of peripheral components are spaced apart by a non-uniform distance therebetween; and
   a resistive resilient material sensor component adjacent the plurality of read components and aligned therewith so that a perpendicular force to the resistive resilient material sensor component forms an electrical contact with the plurality of read components at a given one of a plurality of contact points having corresponding different electrical resistances associated therewith based upon a corresponding different distance between the plurality of peripheral components at each of the plurality of contact points.

2. The device of claim 1, further comprising a haptic feedback component coupled to the resistive resilient material sensor component, wherein the haptic feedback component is positioned in a center of the resistive resilient material sensor component.

3. The device of claim 1, further comprising an auto-centering component coupled to the resistive resilient material sensor component.

4. The device of claim 3, wherein the device is equal to or less than 2 mm in height.

5. The device of claim 1, further comprising a capture enclosure having an aperture and over the resistive resilient material sensor component.

6. The device of claim 5, further comprising an environmental seal component configured to form a seal between the capture enclosure and the resistive resilient material sensor component.

7. The device of claim 1, wherein the resistive resilient material sensor component is configured to be electrically coupled to a voltage and the pair of read components is configured to output a signal value.

8. A method of manufacture of a navigational pointer device comprising the steps of:
   forming a support structure component;
   forming a plurality of read components carried by the support structure component by at least
      forming a continuous round central component, and
      forming a plurality of peripheral components coupled to and extending outwardly from the continuous round central component, the plurality of peripheral components being spaced apart equally about the continuous round central component, and each having a solid triangular shape that has an apex adjacent the continuous round central component so that the plurality of peripheral components are spaced apart by a non-uniform distance therebetween;
   forming a resistive resilient material sensor component adjacent the plurality of read components and aligned therewith so that a perpendicular force to the resistive resilient material sensor component forms an electrical contact with the plurality of components at a given one of a plurality of contact points having corresponding different electrical resistances associated therewith based upon a corresponding different distance between the plurality of peripheral components at each of the plurality of contact points.

9. The method of claim 8, further comprising forming a haptic feedback component coupled to the resistive resilient material sensor component, wherein the haptic feedback component is formed in a center of the resistive resilient material sensor component.

10. The method of claim 8, further comprising forming an auto-centering component and coupling the auto-centering component to the resistive resilient material sensor component.

11. The method of claim 10, wherein the device is formed to be equal to or less than 2 mm in height.

12. The method of claim 8, further comprising—forming a capture enclosure to have an aperture over the resistive resilient material sensor component.

13. The method of claim 12, further comprising forming an environmental seal component and coupling the environmental seal between the capture enclosure and the resistive resilient material sensor component.

14. The method of claim 8, wherein the resistive resilient material sensor component is formed to be electrically coupled to a voltage and the pair of read components is formed for outputting a signal value.

15. A navigational pointer device comprising:
   a support structure component;
   a plurality of read components carried by the support structure and comprising
      a continuous round central component, and
      a plurality of peripheral components coupled to and extending outwardly from the continuous round central component, the plurality of peripheral components being spaced apart equally about the continuous round central component, and each having a solid triangular shape so that the plurality of peripheral components are spaced apart by a non-uniform distance therebetween;
   a resistive resilient material sensor component adjacent the plurality of read components and configured to form electrical contact with the plurality of read components at a given one of a plurality of contact points having corresponding different resistances and corresponding different sized contact footprints defined by the non-uniform distance between the plurality of peripheral components, the corresponding different resistances being based upon the different sized contact footprints at each of the plurality of contact points.

16. The device of claim 15 further comprising a joystick coupled to the pair of read components and configured to transmit a mechanical force to the pair of read components.

17. The device of claim 16 wherein the plurality of read components comprises a plurality of resistive resilient material read components.

18. The device of claim 16, wherein the plurality of read components is configured to be electrically coupled to a voltage and the resistive resilient material sensor component is configured to output a signal value.

19. The device of claim 15 further comprising a capture enclosure defining a non-conductive cover over the pair of read components and resistive resilient material sensor component, and wherein the capture enclosure is configured to hold the pair of read components adjacent the resistive resilient material sensor component.

\* \* \* \* \*